(12) United States Patent
Chin et al.

(10) Patent No.: US 11,671,887 B2
(45) Date of Patent: Jun. 6, 2023

(54) LIMITING HANDOFFS BETWEEN WIRELESS COMMUNICATION NETWORKS DURING A TIME PERIOD

(71) Applicant: QUALCOMM Incorporated, San Diego, CA (US)

(72) Inventors: Tom Chin, San Diego, CA (US); An Mei Chen, San Diego, CA (US); Ajit Chourasia, San Diego, CA (US); Ajith Tom Payyappilly, San Diego, CA (US); Juan Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 6 days.

(21) Appl. No.: 17/232,002

(22) Filed: Apr. 15, 2021

(65) Prior Publication Data

US 2021/0329514 A1   Oct. 21, 2021

Related U.S. Application Data

(60) Provisional application No. 63/012,043, filed on Apr. 17, 2020, provisional application No. 63/081,080, filed on Sep. 21, 2020.

(51) Int. Cl.
*H04W 4/00* (2018.01)
*H04W 36/00* (2009.01)
(Continued)

(52) U.S. Cl.
CPC ... *H04W 36/0094* (2013.01); *H04W 36/0022* (2013.01); *H04W 36/0033* (2013.01);
(Continued)

(58) Field of Classification Search
CPC ......... H04W 36/0022; H04W 36/0033; H04W 36/0055; H04W 36/0058; H04W 36/0061;
(Continued)

(56) References Cited

U.S. PATENT DOCUMENTS

| 10,499,294 B1 | 12/2019 | Tayal et al. |
| 2009/0275334 A1* | 11/2009 | Xie ........................ H04W 36/04 455/436 |

(Continued)

FOREIGN PATENT DOCUMENTS

WO   2021211946   10/2021

OTHER PUBLICATIONS

"PCT Application No. PCT/US2021/027643 International Search Report and Written Opinion", dated Jul. 12, 2021, 15 pages.

(Continued)

*Primary Examiner* — Matthew W Genack
(74) *Attorney, Agent, or Firm* — Arun Swain; Holland & Hart LLP

(57) ABSTRACT

This disclosure provides systems, methods, and apparatus, including computer programs encoded on computer-readable media, for limiting handoffs in cellular networks. In some aspects, a user equipment (UE) may determine a quantity of handoffs that are performed between two or more radio access technologies (RATs) during a time period. The UE may determine whether the quantity of handoffs exceeds a handoff threshold within the time period. The UE may reduce a rate of handoffs when the UE determines that the quantity of handoffs exceeds the handoff threshold within the time period. The UE also may select one of the RATs to camp on and maintain the wireless connection when the UE determines that the quantity of handoffs exceeds the handoff threshold. The UE may determine which RAT to camp on based on handoff count information, handoff total connection time information, or contextual awareness information.

28 Claims, 13 Drawing Sheets

(51) Int. Cl.
  *H04W 36/08* (2009.01)
  *H04W 36/24* (2009.01)
(52) U.S. Cl.
  CPC ............... *H04W 36/0058* (2018.08); *H04W 36/00837* (2018.08); *H04W 36/08* (2013.01); *H04W 36/245* (2013.01)

(58) Field of Classification Search
  CPC ......... H04W 36/0066; H04W 36/0083; H04W 36/00837; H04W 36/0085; H04W 36/0088; H04W 36/0094; H04W 36/08; H04W 36/16; H04W 36/165; H04W 36/24; H04W 36/245
  See application file for complete search history.

(56) References Cited

U.S. PATENT DOCUMENTS

| | | | |
|---|---|---|---|
| 2010/0291931 A1* | 11/2010 | Suemitsu | H04W 36/245 455/436 |
| 2014/0349656 A1 | 11/2014 | Sfar | |
| 2015/0334625 A1* | 11/2015 | Banks | H04W 64/003 455/440 |
| 2016/0050589 A1 | 2/2016 | Safavi | |

OTHER PUBLICATIONS

T-Mobile, et al., "Discussion on Cell Selection and Reselection Parameters", 3GPP Draft; R2-050394, 3rd Generation Partnership Project (3GPP), Mobile Competence Centre; 650, Route Des Lucioles; F-06921 Sophia-Antipolis Cedex , France, vol. RAN WG2, No. Scottsdale, USA; Feb. 9, 2005, Feb. 9, 2005, 14 pages.

* cited by examiner

LIMITING HANDOFFS BETWEEN WIRELESS COMMUNICATION NETWORKS DURING A TIME PERIOD

CROSS-REFERENCE TO RELATED APPLICATIONS

This patent application claims priority to U.S. Provisional Patent Application No. 63/012,043, filed Apr. 17, 2020 and U.S. Provisional Application No. 63/081,080, filed Sep. 21, 2020, both entitled "LIMITING HANDOFFS BETWEEN CELLULAR NETWORKS DURING A TIME PERIOD," and assigned to the assignee hereof. The disclosures of the prior Applications are considered part of and are incorporated by reference in this patent application.

TECHNICAL FIELD

Aspects of the present disclosure relate generally to wireless communication and to techniques for limiting handoffs between wireless communication networks during a time period.

DESCRIPTION OF THE RELATED TECHNOLOGY

Wireless communications systems are widely deployed to provide various types of communication content such as voice, video, packet data, messaging, broadcast, and so on. These systems may be capable of supporting communication with multiple users by sharing the available system resources (such as time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the $3^{rd}$ generation (3G) and long term evolution (LTE) technologies to a next generation new radio (NR) technology, which may be referred to as $5^{th}$ Generation (5G) or 5G NR. For example, NR is designed to provide a lower latency, a higher bandwidth or a higher throughput, and a higher reliability than 3G or LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave (mmW)) bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing can extend the benefit of NR technologies to operating entities that may not have access to a licensed spectrum.

Wireless communication networks may support some combination of 3G, LTE, and 5G NR technologies. A UE may communicate with the wireless communication network using one or more of the 3G, LTE, and 5G NR technologies. For example, the UE may use 5G NR for some applications, such as data transmissions, and may use LTE for other applications, such as voice transmissions. A UE also may have access to wireless local area networks (WLANs) in the wireless communication network.

SUMMARY

The systems, methods, and devices of this disclosure each have several innovative aspects, no single one of which is solely responsible for the desirable attributes disclosed herein.

One innovative aspect of the subject matter described in this disclosure can be implemented in a method for wireless communication performed by an apparatus of a user equipment (UE). The method may include monitoring a quantity of handoffs between a plurality of RATs during a time period. The method may include reducing a rate of handoffs associated with the UE and selecting one of the plurality of RATs for maintaining a wireless connection with the UE in response to the quantity of handoffs exceeding a handoff threshold within the time period.

Another innovative aspect of the subject matter described in this disclosure can be implemented in a method for wireless communication performed by an apparatus of a UE. The method may include monitoring a quantity of handovers between a plurality of RATs during a time period. The method may include selecting one of the plurality of RATs and reducing a rate of handovers associated with the UE in response to the quantity of handovers exceeding a handover threshold within the time period. The method may include altering a handover measurement report to cause a wireless connection to be maintained with the selected one of plurality of RATs.

Another innovative aspect of the subject matter described in this disclosure can be implemented in an apparatus of a UE for wireless communication. The apparatus of the UE may include one or more interfaces for communicating via a wireless communication network. The apparatus of the UE may include one or more processors configured to monitor a quantity of handoffs between a plurality of RATs during a time period, and reduce a rate of handoffs associated with the UE and select one of the plurality of RATs for maintaining a wireless connection with the UE in response to the quantity of handoffs exceeding a handoff threshold within the time period.

Another innovative aspect of the subject matter described in this disclosure can be implemented in an apparatus of a UE for wireless communication. The apparatus of the UE may include one or more interfaces for communicating via a wireless communication network. The apparatus of the UE may include one or more processors configured to monitor a quantity of handovers between a plurality of RATs during a time period, select one of the plurality of RATs and reduce a rate of handovers associated with the UE in response to the quantity of handovers exceeding a handover threshold within the time period, and alter a handover measurement report to cause a wireless connection to be maintained with the selected one of plurality of RATs.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

FIG. 4 shows an example UE configured to collect and analyze handoff-related information to determine whether to reduce the rate of handoffs and to select a radio access technology (RAT) to camp on.

FIG. 9 shows an example UE configured to collect and analyze contextual awareness information to determine whether to reduce the rate of handoffs and to select which RAT to camp on.

FIG. 11 depicts a flowchart with example operations performed by an apparatus of a UE for reducing a rate of handovers between wireless networks and selecting one of a plurality of RATs to camp on.

Like reference numbers and designations in the various drawings indicate like elements.

DETAILED DESCRIPTION

Figure 1:
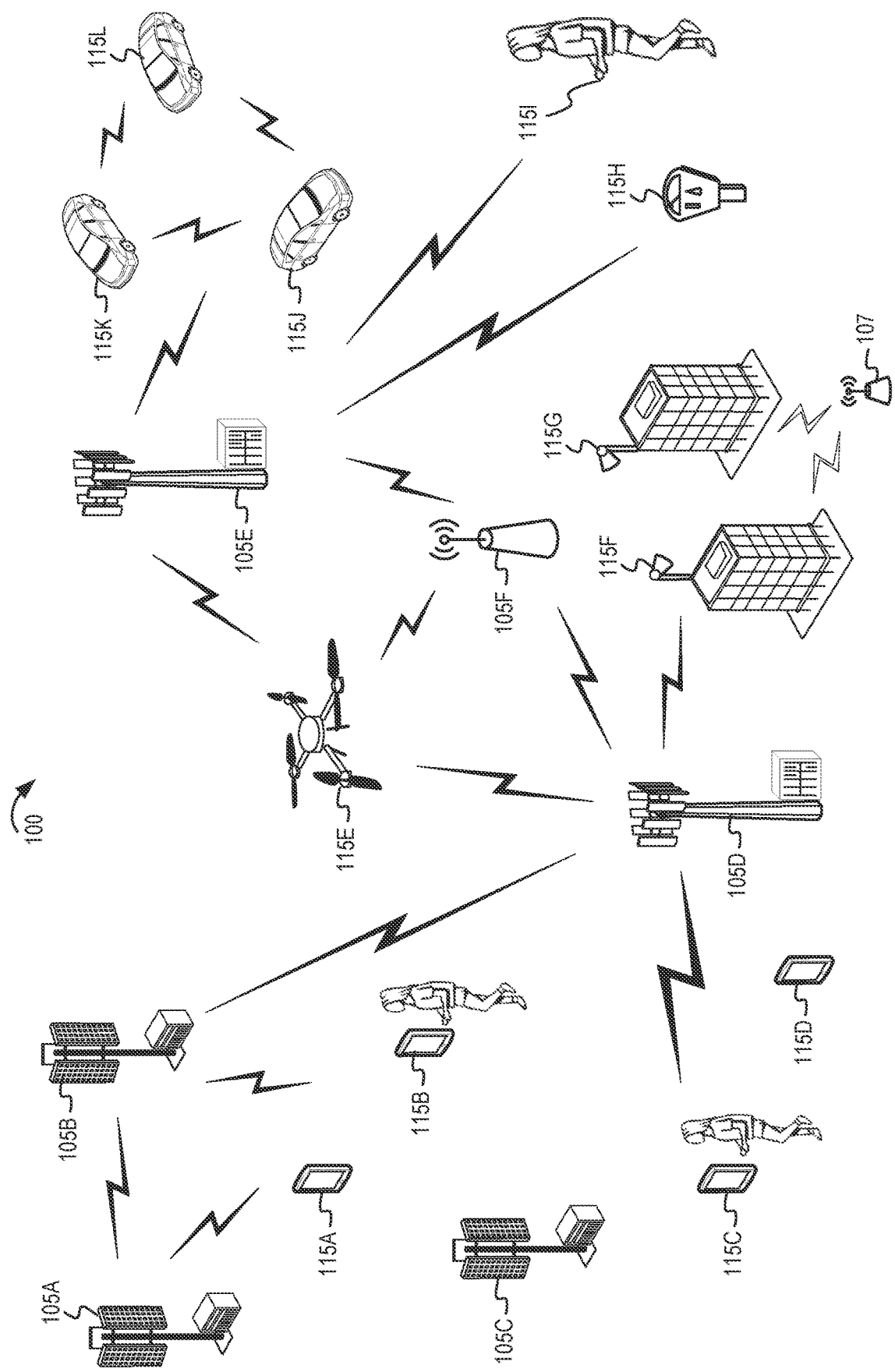
FIG. 1 is a system diagram of an example wireless communication network.

The following description is directed to certain implementations for the purposes of describing the innovative aspects of this disclosure. However, a person having ordinary skill in the art will readily recognize that the teachings herein can be applied in a multitude of different ways. The examples in this disclosure are based on wireless network communications in wide area networks (WANs). However, the described implementations may be implemented in any device, system or network that is capable of transmitting and receiving radio frequency signals according to any of the wireless communication standards, including any of the Institute of Electrical and Electronics Engineers (IEEE) 802.11 standards, the Bluetooth® standard, code division multiple access (CDMA), time division multiple access (TDMA), frequency division multiple access (FDMA), orthogonal FDMA (OFDMA), single-carrier FDMA (SC-FDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1xEV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), $5^{th}$ Generation (5G) or new radio (NR), Advanced Mobile Phone Service (AMPS), or other known signals that are used to communicate within a wireless, cellular or internet of things (IoT) network, such as a system utilizing 3G, 4G or 5G, or further implementations thereof, technology.

A wireless communication network (which also may be referred to as a WAN) may include a 5G NR radio access technology (RAT) of a 5G NR network, an LTE RAT of an LTE network, and a 3G RAT of a 3G network. Each of the RATs of a WAN also may be referred to as a WAN RAT. A user equipment (UE) of the wireless communication network may use the 5G NR RAT, the LTE RAT, or the 3G RAT depending on which wireless coverage is available to the UE and which wireless coverage provides the best quality service. During the initial stages of 5G NR deployment, the 5G NR coverage may not be ubiquitous. Thus, UEs may have LTE and 3G coverage in most locations, but may have 5G NR coverage in only limited areas, such as downtown areas and major highways. Even in areas that have substantial 5G NR deployments, there may be coverage holes between 5G NR coverage areas. In locations that are at the edge of a 5G NR network and an LTE network, or in locations that have coverage holes, UEs may move between the two cellular networks multiple times in a short period of time. In some cases, a UE may move between one or more cellular networks and a wireless local area network (WLAN) multiple times in a short period of time. Frequent handoffs between two or more cellular networks and a WLAN in a short period of time may lead to throughput degradation and service interruption at the UEs. For example, the disruptions at the application layer may be in the order of multiple seconds because of the change in the Internet Protocol (IP) address and the reconnections to the Transmission Control Protocol (TCP). The throughput degradation and service interruptions may impact the overall quality of service (QoS) and user experience.

In some implementations, a UE may be configured to track or monitor the quantity of handoffs that are performed between a first RAT and a second RAT during a time period. For example, the UE may count or otherwise determine the quantity of handoffs that are performed between a first base station (BS) of the first RAT and a second BS of the second RAT. As another example, the UE may determine the quantity of handoffs that are performed between a first cell of the first BS of the first RAT and a second cell of the first BS of the same first RAT. In some implementations, a UE may be configured to track or monitor the quantity of handoffs that are performed between three or more RATs, such as a first RAT, a second RAT and a third RAT, during a time period. For example, the UE may count or otherwise determine the quantity of handoffs that are performed between a first RAT (such as a 5G NR RAT), a second RAT (such as an LTE RAT), and a third RAT (such as a WLAN RAT). Handoffs may be referred to as reselections when the UE is in an idle mode, and handoffs may be referred to as handovers when the UE is in a connected mode. The quantity of handoffs may be reselections, handovers, or both reselections and handovers. The UE may determine whether the quantity of handoffs exceeds a handoff threshold within the time period. In one non-limiting example, the handoff threshold may be 10 handoffs and the time period may be 1 minute. The UE may determine to reduce a rate of handoffs in response to determining the quantity of handoffs exceeds the handoff threshold within the time period. The UE also may select either the first RAT or the second RAT to camp on when the rate of handoffs is reduced. For example, selecting either the first RAT or the second RAT to camp on may include the UE selecting either the first BS associated with the first RAT or the second BS associated with the second RAT to establish and maintain a wireless connection with the UE when the rate of handoffs is reduced. In some implementations, the first BS associated with the first RAT may support any one of 5G NR, LTE, and 3G communications, the second BS associated with the second RAT may supports any one of 5G NR, LTE, and 3G communications, and a third RAT may support WLAN communications. In some implementations, the first RAT may implement a 5G NR RAT having a standalone (SA) 5G architecture or an LTE RAT having an SA 4G architecture, and the second RAT may implement a 5G NR RAT or an LTE RAT having a non-standalone (NSA) 5G architecture.

In some implementations, the UE may reduce the rate of handoffs by reducing the frequency of sending handoff-related messages to the BSs associated with the RATs, by not sending handoff-related messages to the BSs, by ignoring handoff-related messages received from the BSs, or by altering the information in handoff-related messages that are sent to the BSs. For example, if the UE is in an idle mode, the UE may reduce the rate of reselections by stopping or reducing the frequency of sending random access channel (RACH) requests (or similar messages) to the BSs. As another example, if the UE is in a connected mode, the UE may reduce the rate of handovers by stopping or reducing the frequency of sending handover measurement reports (or similar messages) to the BSs. The UE 120 also may reduce the rate of handovers by altering the information in the handover measurement reports.

In some implementations, the UE may determine whether to select the first RAT or the second RAT when the rate of handoffs is reduced based on handoff count information, total connection time information, or contextual awareness information. For example, the UE may select the RAT having the most handoffs from the quantity of handoffs within the time period. As another example, the UE may select the RAT that the UE spent the most time connected to during the time period. As another example, the UE may select the RAT based on real-time contextual awareness information and historical contextual awareness information.

In some implementations, an application processor of the UE and a modem of the UE may use a modem control interface as a communication interface to exchange information and commands, and determine whether to limit the number of handoffs between the RATs. For example, based on the historical and real-time contextual awareness information, the application processor may provide a modem control command to the modem via the modem control interface to cause the modem to reduce the rate of handoffs and to select which RAT to camp on.

Particular implementations of the subject matter described in this disclosure can be implemented to realize one or more of the following potential advantages. The UE limiting handoffs between RATs by reducing the rate of handoffs may minimize the throughput degradation and service interruptions at the UE associated with frequent handoffs. Thus, the UE limiting handoffs between RATs by reducing the rate of handoffs may improve data throughput and improve quality of service (QoS). Improving data throughput and QoS may result in an improved user experience. The UE limiting handoffs between RATs by reducing the rate of handoffs also may reduce power consumption at the UE, may increase UE standby time, may reduce end-to-end latency, and may reduce traffic to the wireless communication network, which may improve the overall network performance. Furthermore, the UE selecting one of the RATs to camp on based on contextual awareness information determined by the UE may cause the handoff to be performed quicker and with reduced service interruption compared to handoffs that do not use contextual awareness information or handoffs that solely rely on information collection and analysis on the network side. Also, by using the UE's location and contextual awareness information associated with the location, the UE's application processor may provide a modem control command to a modem of the UE to limit the number of measurement reports transmitted, reduce the rate of handoffs between RATs, and to enable selection of a RAT to camp on, which may result in reduced power consumption and improved user experience.

FIG. 1 is a system diagram of an example wireless communication network 100. The wireless communication network 100 may be an LTE network or a 5G NR network, or a combination thereof. The wireless communication network 100 includes a number of base stations (BSs) 105 (individually labeled as 105A, 105B, 105C, 105D, 105E, and 105F) and other network entities. A BS 105 may be a station that communicates with UEs 115 and also may be referred to as an evolved node B (eNB), a next generation eNB (gNB), an access point, and the like. In some implementations, a BS 105 may represent an eNB of an LTE network or a gNB of a 5G NR network, or a combination thereof. Each BS 105 may provide communication coverage for a particular geographic area. In 3GPP, the term "cell" can refer to this particular geographic coverage area of a BS 105 or a BS subsystem serving the coverage area, depending on the context in which the term is used.

A BS 105 may provide communication coverage for a macro cell or a small cell, such as a pico cell or a femto cell, or other types of cells. A macro cell generally covers a relatively large geographic area (such as several kilometers in radius) and may allow unrestricted access by UEs with service subscriptions with the network provider. A pico cell generally covers a relatively smaller geographic area and may allow unrestricted access by UEs with service subscriptions with the network provider. A femto cell generally covers a relatively small geographic area (such as a home) and, in addition to unrestricted access, also may provide restricted access by UEs having an association with the femto cell (such as UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105D and 105E may be regular macro BSs, while the BSs 105A-105C may be macro BSs enabled with three dimensions (3D), full dimensions (FD), or massive MIMO. The BSs 105A-105C may take advantage of their higher dimension MIMO capabilities to exploit 3D beamforming in both elevation and azimuth beamforming to increase coverage and capacity. The BS 105F may be a small cell BS which may be a home node or portable access point. A BS 105 may support one or multiple (such as two, three, four, and the like) cells.

The wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless communication network 100, and each UE 115 may be stationary or mobile. A UE 115 also may be referred to as a terminal, a mobile station, a wireless device, a subscriber unit, a station, or the like. A UE 115 may be a mobile phone, a personal digital assistant (PDA), a wireless modem, a wireless communication device, a handheld device, a wearable device, a tablet computer, a laptop computer, a cordless phone, a wireless local loop (WLL) station, a smart appliance, a drone, a video camera, a sensor, or the like. In one aspect, a UE 115 may be a device that includes a Universal Integrated Circuit Card (UICC). In another aspect, a UE may be a device that does not include a UICC. In some aspects, the UEs 115 that do not include UICCs also may be referred to as IoT devices or internet of everything (IoE) devices. The UEs 115A-115D are examples of mobile smart phone-type devices that may access the wireless communication network 100. A UE 115 also may be a machine specifically configured for connected communication, including machine type communication (MTC), enhanced MTC (eMTC), narrowband IoT (NB-IoT), and the like. The UEs 115E-115L are examples of various machines configured for communication that access the wireless communication network 100. A UE 115 may be able to communicate with any type of the BSs, whether macro BS, small cell, or the like. In FIG. 1, a lightning bolt is representative of a communication link that indicates wireless transmissions between a UE 115 and a serving BS 105, which is a BS designated to serve the UE 115 on the downlink and uplink, or desired transmission between BSs, and backhaul transmissions between BSs.

In operation, the BSs 105A-105C may serve the UEs 115A and 115B using 3D beamforming and coordinated spatial techniques, such as coordinated multipoint (CoMP) or multi-connectivity. The macro BS 105D may perform backhaul communications with the BSs 105A-105C, as well as the BS 105F (which may be a small cell BS). The macro BS 105D also may transmit multicast services which are subscribed to and received by the UEs 115C and 115D. Such multicast services may include mobile television or stream video, or may include other services for providing community information, such as weather emergencies or alerts, such as Amber alerts or gray alerts.

The BSs 105 also may communicate with a core network. The core network may provide user authentication, access authorization, tracking, Internet Protocol (IP) connectivity, and other access, routing, or mobility functions. At least some of the BSs 105 (such as a gNB or an access node controller (ANC)) may interface with the core network through backhaul links (such as NG-C and NG-U) and may perform radio configuration and scheduling for communication with the UEs 115. In various examples, the BSs 105 may communicate, either directly or indirectly (such as through core network), with each other over backhaul links, which may be wired or wireless communication links.

The wireless communication network 100 also may support mission critical communications with ultra-reliable and redundant links for mission critical devices, such as the UE 115E, which may be a drone. Redundant communication links with the UE 115E may include links from the macro BSs 105D and 105E, as well as links from the small cell BS 105F. Other machine type devices, such as the UE 115F and UE 115G (such as video cameras or smart lighting), the UE 115H (such as a smart meter), and UE 115I (such as a wearable device) may communicate through the wireless communication network 100 either directly with the BSs, such as the small cell BS 105F, and the macro BS 105E, or in multi-hop configurations by communicating with another user device which relays its information to the wireless communication network 100. For example, the UE 115H may communicate smart meter information to the UE 115I (such as a wearable device or mobile phone), which may then report to the wireless communication network 100 through the small cell BS 105F. The wireless communication network 100 also may provide additional network efficiency through dynamic, low-latency TDD/FDD communications, such as in vehicle-to-vehicle (V2V) communications, as shown by UEs 115J-115L. Furthermore, the wireless communication network 100 may include one or more access points (APs) 107 that are part of one or more wireless local area networks (WLANs). The APs 107 (which also may be referred to as WLAN APs) may provide short-range wireless connectivity to the UEs 115 of the wireless communication network 100.

In some implementations, the wireless communication network 100 may utilize OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW also may be partitioned into subbands. In other instances, the subcarrier spacing and/or the duration of TTIs may be scalable.

The BSs 105 may assign or schedule transmission resources (such as in the form of time-frequency resource blocks (RB)) for downlink (DL) and uplink (UL) transmissions in the wireless communication network 100. DL refers to the transmission direction from a BS 105 to a UE 115, whereas UL refers to the transmission direction from a UE 115 to a BS 105. The communication can be in the form of radio frames. A radio frame may be divided into a plurality of subframes or slots. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (such as the DL subframes) in a radio frame may be used for DL transmissions, and another subset of the subframes (such as the UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell-specific reference signals (CRSs) or channel state information reference signals (CSI-RSs) to enable a UE 115 to estimate a DL channel. Similarly, a UE 115 may transmit sounding reference signals (SRSs) to enable a BS 105 to estimate a UL channel. Control information may include resource assignments and protocol controls. Data may include protocol data and operational data. In some aspects, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for UL communication.

In some aspects, the wireless communication network 100 may be an NR network deployed over a licensed spectrum or an NR network deployed over an unlicensed spectrum (such as NR-U and NR-U lite networks). The BSs 105 can transmit synchronization signals, including a primary synchronization signal (PSS) and a secondary synchronization signal (SSS), in the wireless communication network 100 to facilitate synchronization. The BSs 105 can broadcast system information associated with the wireless communication network 100 (such as a master information block (MIB), remaining system information (RMSI), and other system information (OSI)) to facilitate initial network access. In some instances, the BSs 105 may broadcast one or more of the PSS, the SSS, and the MIB in the form of synchronization signal blocks (SSBs) over a physical broadcast channel (PBCH) and may broadcast one or more of the RMSI and the OSI over a physical downlink shared channel (PDSCH).

In some aspects, a UE 115 attempting to access the wireless communication network 100 may perform an initial cell search by detecting a PSS included in an SSB from a BS 105. The PSS may enable synchronization of period timing and may indicate a physical layer identity value. The UE 115 may then receive an SSS included in an SSB from the BS 105. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 115 may receive an MIB. The MIB may include system information for initial network access and scheduling information for at least one of an RMSI and OSI. After decoding the MIB, the UE 115 may receive at least one of an RMSI and OSI. The RMSI and OSI may include radio resource control (RRC) information related to random access channel (RACH) procedures, paging, control resource set (CORESET) for physical downlink control channel (PDCCH) monitoring, physical uplink control channel (PUCCH), physical uplink shared channel (PUSCH), power control, and SRS.

After obtaining one or more of the MIB, the RMSI and the OSI, the UE 115 can perform a random access procedure to establish a connection with the BS 105. In some examples, the random access procedure may be a four-step random access procedure. For example, the UE 115 may transmit a physical random access channel (PRACH), such as a PRACH preamble, and the BS 105 may respond with a random access response (RAR). The RAR may include one or more of a detected random access preamble identifier (ID) corresponding to the PRACH preamble, timing advance (TA) information, a UL grant, a temporary cell-radio network temporary identifier (C-RNTI), and a backoff indicator. Upon receiving the RAR, the UE 115 may transmit a connection request to the BS 105 and the BS 105 may respond with a connection response. The connection response may indicate a contention resolution. In some examples, the PRACH, the RAR, the connection request, and the connection response can be referred to as message 1 (MSG1), message 2 (MSG2), message 3 (MSG3), and message 4 (MSG4), respectively. In some examples, the random access procedure may be a two-step random access procedure, where the UE 115 may transmit a PRACH (including a PRACH preamble) and a connection request in a single transmission and the BS 105 may respond by transmitting a RAR and a connection response in a single transmission.

After establishing a connection, the UE 115 and the BS 105 can enter a normal operation stage, where operational data may be exchanged. For example, the BS 105 may schedule the UE 115 for UL and DL communications. The BS 105 may transmit UL and DL scheduling grants to the UE 115 via a PDCCH. The BS 105 may transmit a DL communication signal to the UE 115 via a PDSCH according to a DL scheduling grant. The UE 115 may transmit a UL communication signal to the BS 105 via a PUSCH or PUCCH according to a UL scheduling grant.

In some aspects, the wireless communication network 100 may operate over a system BW or a component carrier BW. The wireless communication network 100 may partition the system BW into multiple bandwidth parts (BWPs). A BWP may be a certain portion of the system BW. For example, if the system BW is 100 MHz, the BWPs may each be 20 MHz or less. A BS 105 may dynamically assign a UE 115 to operate over a certain BWP. The assigned BWP may be referred to as the active BWP. The UE 115 may monitor the active BWP for signaling information from the BS 105. The BS 105 may schedule the UE 115 for UL or DL communications in the active BWP. In some implementations, the BS 105 may configure UEs 115 with narrowband operation capabilities (such as with transmission and reception limited to a BW of 20 MHz or less) to perform BWP hopping for channel monitoring and communications.

In some aspects, a BS 105 may assign a pair of BWPs within the component carrier to a UE 115 for UL and DL communications. For example, the BWP pair may include one BWP for UL communications and one BWP for DL communications. The BS 105 may additionally configure the UE 115 with one or more CORESETs in a BWP. A CORESET may include a set of frequency resources spanning a number of symbols in time. The BS 105 may configure the UE 115 with one or more search spaces for PDCCH monitoring based on the CORESETS. The UE 115 may perform blind decoding in the search spaces to search for DL control information (such as UL or DL scheduling grants) from the BS 105. For example, the BS 105 may configure the UE 115 with one or more of the BWPs, the CORESETS, and the PDCCH search spaces via RRC configurations.

In some aspects, the wireless communication network 100 may operate over a shared frequency band or an unlicensed frequency band, for example, at about 3.5 gigahertz (GHz), sub-6 GHz or higher frequencies in the mmWave band. The wireless communication network 100 may partition a frequency band into multiple channels, for example, each occupying about 20 MHz. The BSs 105 and the UEs 115 may be operated by multiple network operating entities sharing resources in the shared communication medium and may employ a LBT procedure to acquire channel occupancy time (COT) in the share medium for communications. A COT may be non-continuous in time and may refer to an amount of time a wireless node can send frames when it has won contention for the wireless medium. Each COT may include a plurality of transmission slots. A COT also may be referred to as a transmission opportunity (TXOP). The BS 105 or the UE 115 may perform an LBT in the frequency band prior to transmitting in the frequency band. The LBT can be based on energy detection or signal detection. For energy detection, the BS 105 or the UE 115 may determine that the channel is busy or occupied when a signal energy measured from the channel is greater than a certain signal energy threshold. For signal detection, the BS 105 or the UE 115 may determine that the channel is busy or occupied when a certain reservation signal (such as a preamble signal sequence) is detected in the channel.

Figure 2:
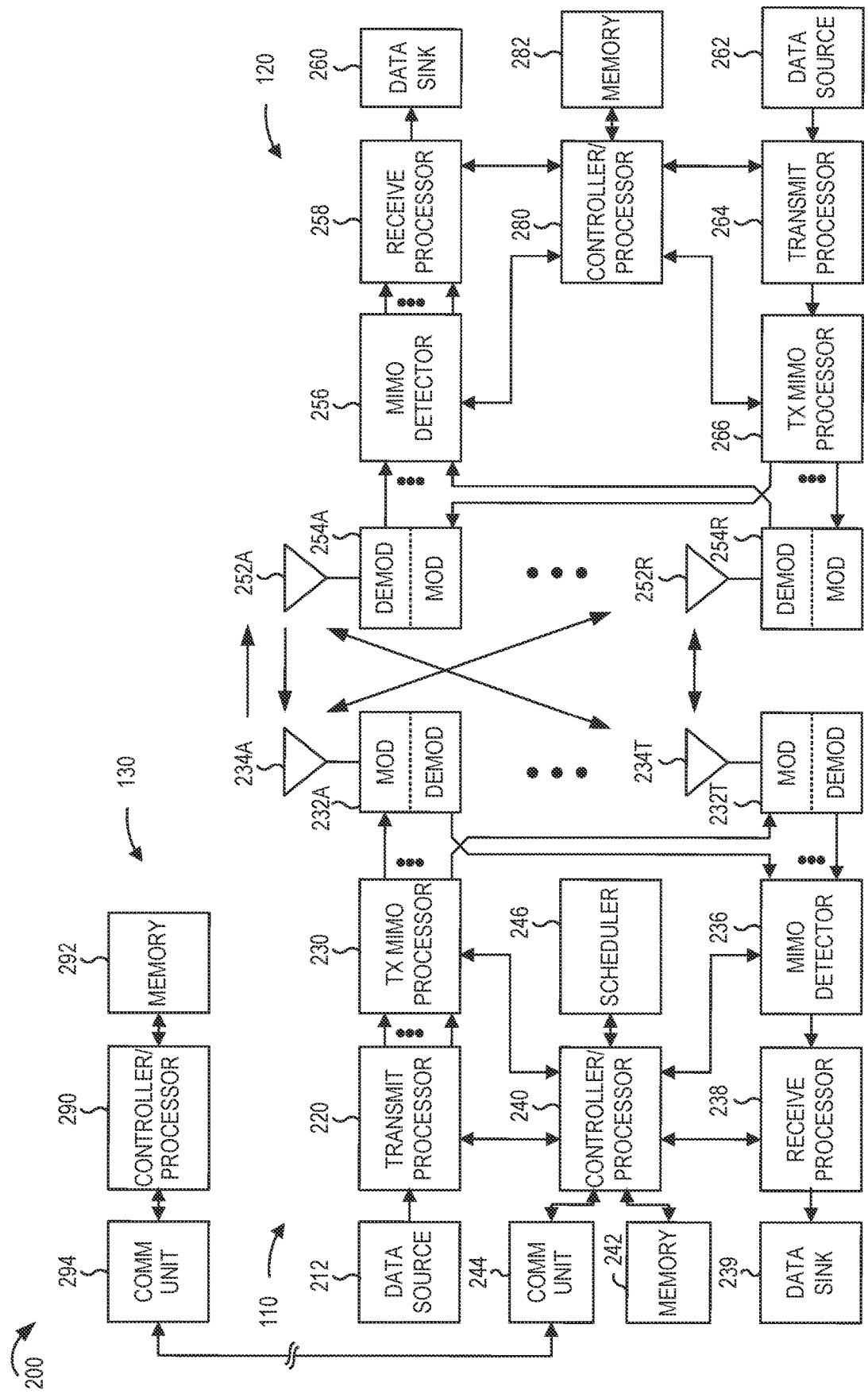
FIG. 2 is a block diagram conceptually illustrating an example of a base station (BS) in communication with a user equipment (UE).

FIG. 2 is a block diagram conceptually illustrating an example 200 of a BS 110 in communication with a UE 120. In some aspects, BS 110 and UE 120 may respectively be one of the BSs and one of the UEs in wireless communication network 100 of FIG. 1. BS 110 may be equipped with T antennas 234A through 234T, and UE 120 may be equipped with R antennas 252A through 252R, where in general T≥1 and R≥1.

At BS 110, a transmit processor 220 may receive data from a data source 212 for one or more UEs, select one or more modulation and coding schemes (MCS) for each UE based at least in part on channel quality indicators (CQIs) received from the UE, process (for example, encode and modulate) the data for each UE based at least in part on the MCS(s) selected for the UE, and provide data symbols for all UEs. The transmit processor 220 also may process system information (for example, for semi-static resource partitioning information (SRPI), etc.) and control information (for example, CQI requests, grants, upper layer signaling, etc.) and provide overhead symbols and control symbols. The transmit processor 220 also may generate reference symbols for reference signals (for example, the cell-specific reference signal (CRS)) and synchronization signals (for example, the primary synchronization signal (PSS) and secondary synchronization signal (SSS)). A transmit (TX) multiple-input multiple-output (MIMO) processor 230 may perform spatial processing (for example, precoding) on the data symbols, the control symbols, the overhead symbols, or the reference symbols, if applicable, and may provide T output symbol streams to T modulators-demodulators (MODs-DEMODs) 232A through 232T (which also may be referred to as mods/demods or modems). Each MOD-DEMOD 232 may process a respective output symbol stream (for example, for OFDM, etc.) to obtain an output sample stream. Each MOD-DEMOD 232 may further process (for example, convert to analog, amplify, filter, and upconvert) the output sample stream to obtain a downlink signal. T downlink signals from MODs-DEMODs 232A through 232T may be transmitted via T antennas 234A through 234T, respectively. According to various aspects described in more detail below, the synchronization signals can be generated with location encoding to convey additional information.

At UE 120, antennas 252A through 252R may receive the downlink signals from BS 110 or other BSs and may provide received signals to modulators-demodulators (MODs-DEMODs) 254A through 254R, respectively (which also may be referred to as mods/demods or modems). Each MOD-DEMOD 254 may condition (for example, filter, amplify, downconvert, and digitize) a received signal to obtain input samples. Each MOD-DEMOD 254 may further process the input samples (for example, for OFDM, etc.) to obtain received symbols. A MIMO detector 256 may obtain received symbols from all R MODs-DEMODs 254A through 254R, perform MIMO detection on the received symbols if applicable, and provide detected symbols. A receive processor 258 may process (for example, demodulate and decode) the detected symbols, provide decoded data for UE 120 to a data sink 260, and provide decoded control information and system information to a controller or processor (controller/processor) 280. A channel processor may determine reference signal received power (RSRP), received signal strength indicator (RSSI), reference signal received quality (RSRQ), channel quality indicator (CQI), etc. In some aspects, one or more components of UE 120 may be included in a housing.

On the uplink, at UE 120, a transmit processor 264 may receive and process data from a data source 262 and control information (for example, for reports including RSRP, RSSI, RSRQ, CQI, etc.) from controller/processor 280. Transmit processor 264 also may generate reference symbols for one or more reference signals. The symbols from transmit processor 264 may be precoded by a TX MIMO processor 266 if applicable, further processed by MODs-DEMODs 254A through 254R (for example, for DFT-s-OFDM, CP-OFDM, etc.), and transmitted to BS 110. At BS 110, the uplink signals from UE 120 and other UEs may be received by antennas 234, processed by MOD-DEMOD 232, detected by a MIMO detector 236 if applicable, and further processed by a receive processor 238 to obtain decoded data and control information sent by UE 120. Receive processor 238 may provide the decoded data to a data sink 239 and the decoded control information to a controller or processor (i.e., controller/processor) 240. The BS 110 may include communication unit 244 and may communicate to network controller 130 via communication unit 244. The network controller 130 may include communication unit 294, a controller or processor (i.e., controller/processor) 290, and memory 292.

The controller/processor 240 of BS 110, the controller/processor 280 of UE 120, or any other component(s) of FIG. 2 may perform one or more techniques associated with limiting handoffs between RATs, as described in more detail elsewhere herein. For example, the controller/processor 240 of BS 110, the controller/processor 280 of UE 120, or any other component(s) (or combinations of components) of FIG. 2 may perform or direct operations of, for example, the process depicted by flowchart 900 of FIG. 9, the process depicted by flowchart 1000 of FIG. 10, or other processes as described herein, such as the processes described in FIGS. 3-9. The memories 242 and 282 may store data and program codes for BS 110 and UE 120, respectively. A scheduler 246 may schedule UEs for data transmission on the downlink, the uplink, or a combination thereof.

Figure 7:
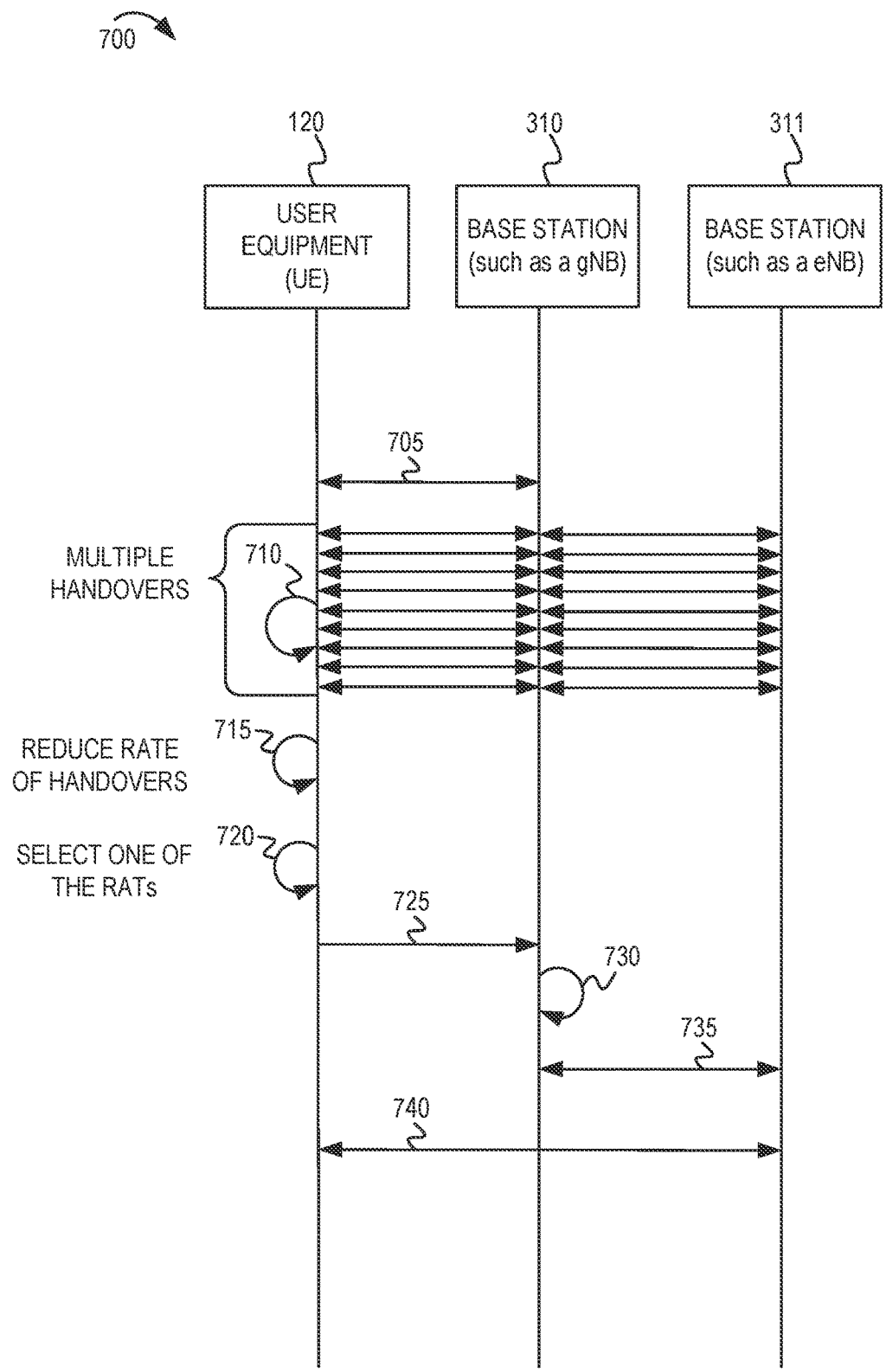
FIG. 7 shows an example message flow that shows a UE configured to reduce the rate of handovers and select either a first BS associated with a first RAT or a second BS associated with a second RAT.
Figure 8:
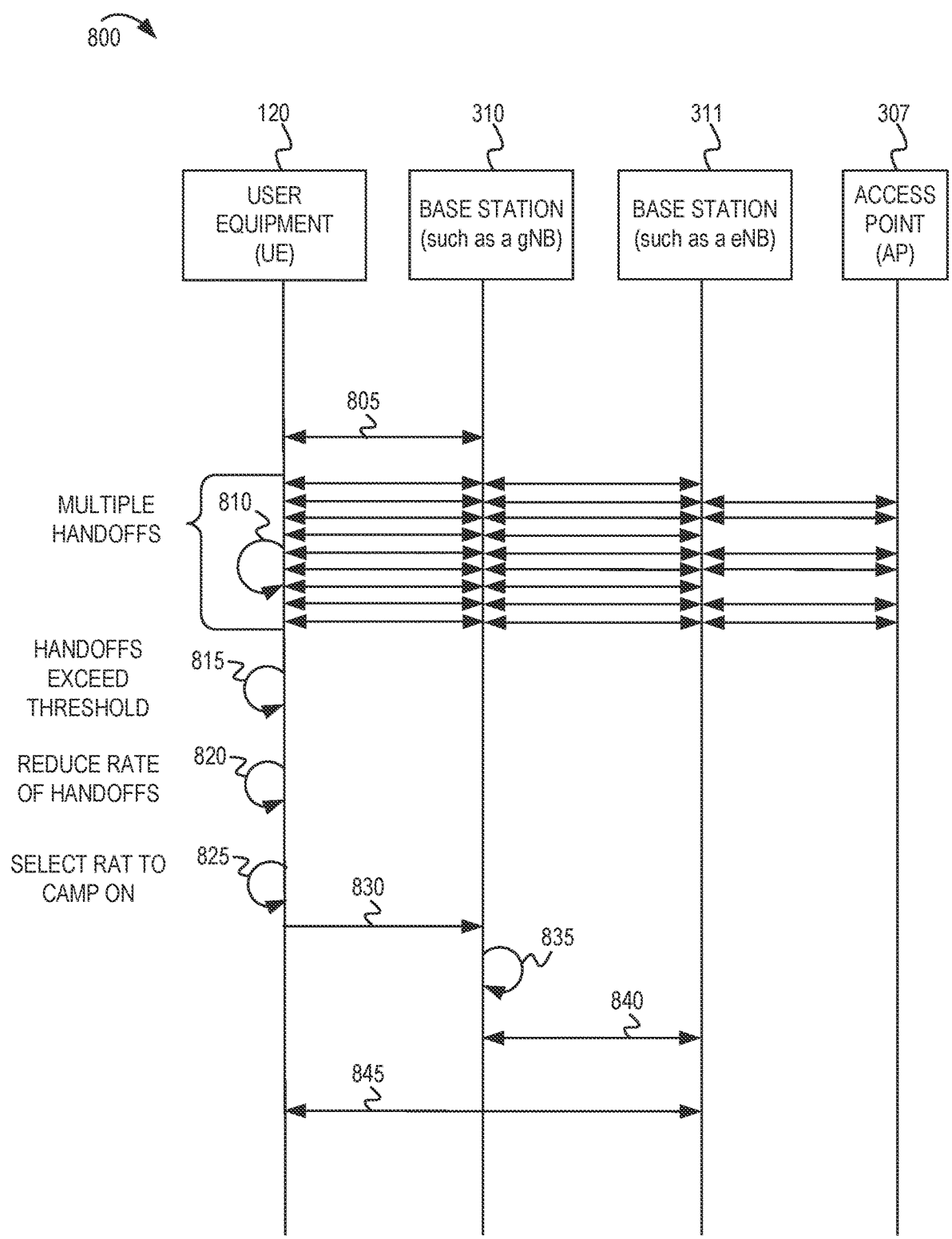
FIG. 8 shows an example message flow that shows a UE configured to monitor a quantity of handoffs between a first RAT, a second RAT and a third RAT to determine whether to reduce the rate of handoffs.
Figure 9:
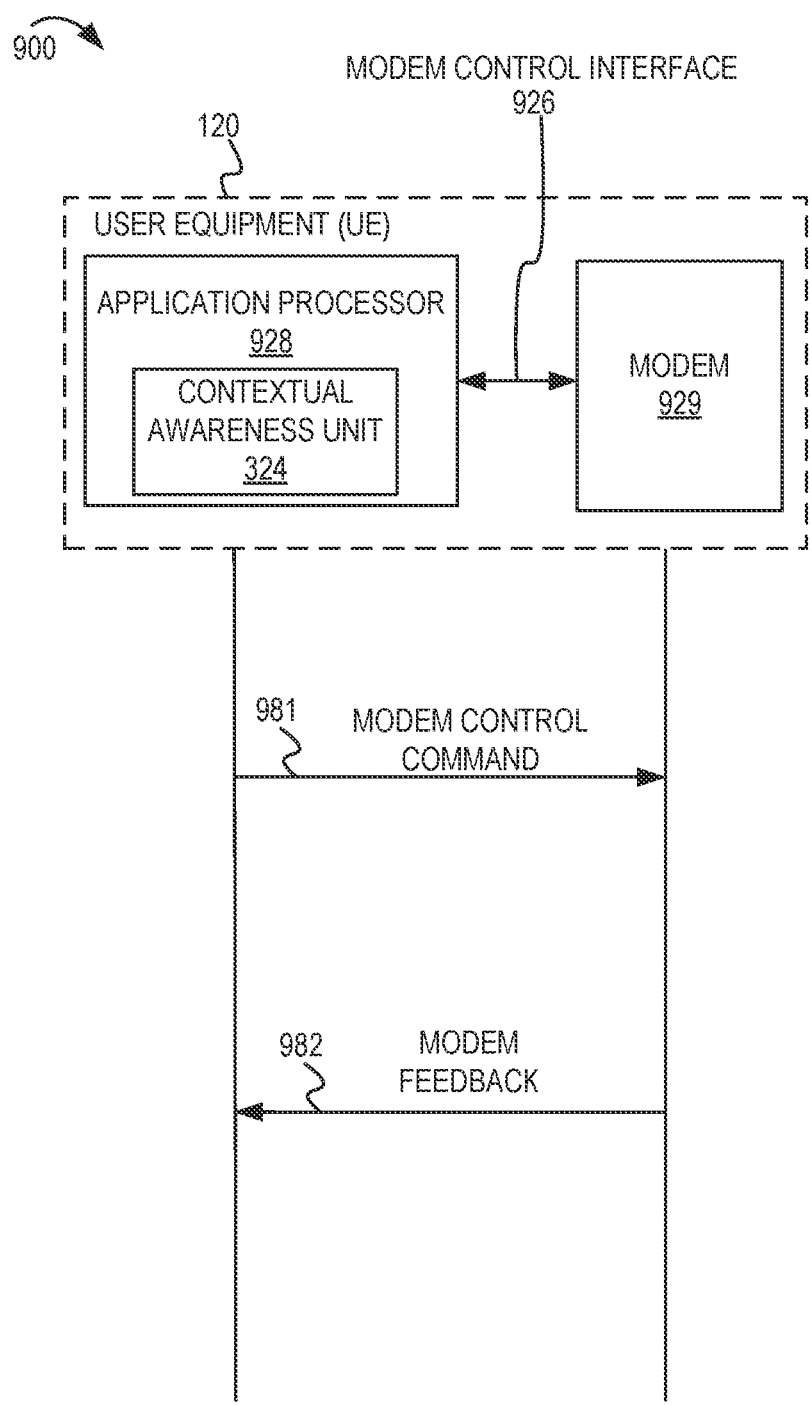
Figure 10:
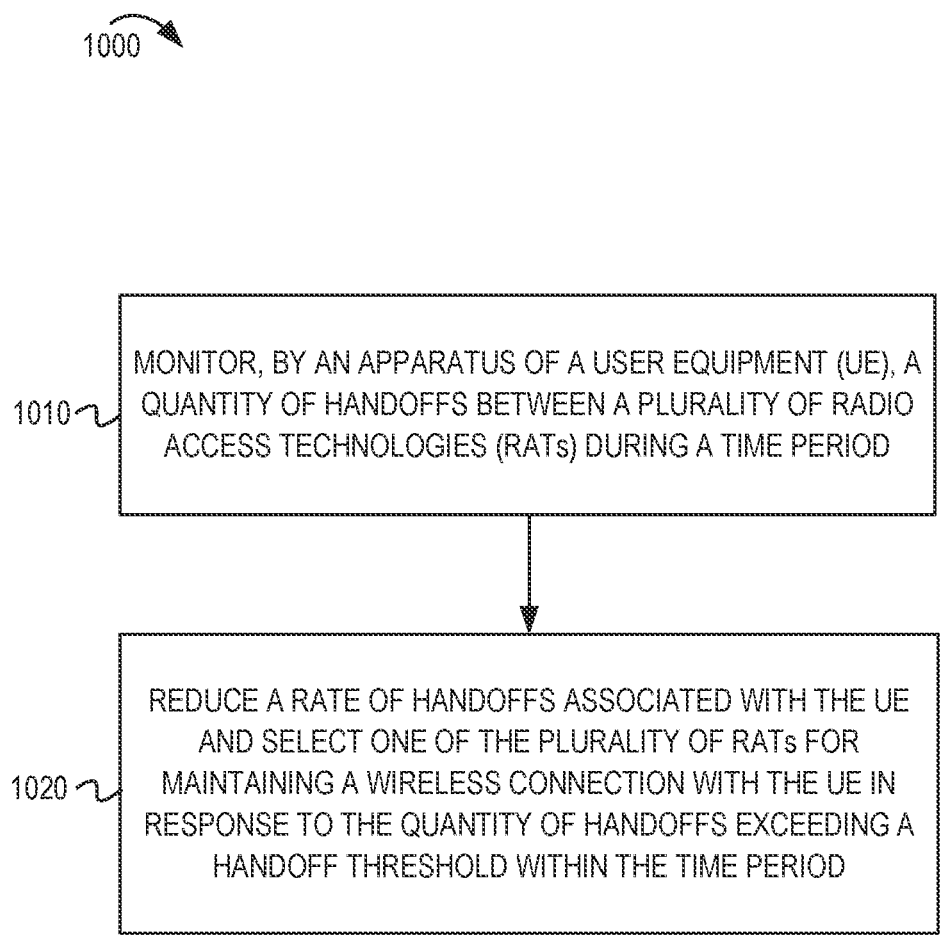
FIG. 10 depicts a flowchart with example operations performed by an apparatus of a UE for reducing a rate of handoffs between wireless networks.

The stored program codes, when executed by the controller/processor 280 or other processors and modules at UE 120, may cause the UE 120 to perform operations described with respect to the process depicted by flowchart 900 of FIG. 9, the process depicted by flowchart 1000 of FIG. 10, or other processes as described herein, such as the processes described in FIGS. 3-9. The stored program codes, when executed by the controller/processor 240 or other processors and modules at BS 110, may cause the BS 110 to perform operations described with respect to the process depicted by flowchart 900 of FIG. 9, the process depicted by flowchart 1000 of FIG. 10, or other processes as described herein, such as the processes described in FIGS. 3-9. A scheduler 246 may schedule UEs for data transmission on the downlink, the uplink, or a combination thereof.

In some aspects, UE 120 may include means for performing the process depicted by flowchart 900 of FIG. 9, the process depicted by flowchart 1000 of FIG. 10, or other processes as described herein, such as the processes described in FIGS. 3-9. In some aspects, such means may include one or more components of UE 120 described in connection with FIG. 2.

In some aspects, BS 110 may include means for performing the process depicted by flowchart 900 of FIG. 9, the process depicted by flowchart 1000 of FIG. 10, or other processes as described herein, such as the processes described in FIGS. 3-9. In some aspects, such means may include one or more components of BS 110 described in connection with FIG. 2.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, the TX MIMO processor 266, or another processor may be performed by or under the control of controller/processor 280.

Figure 3:
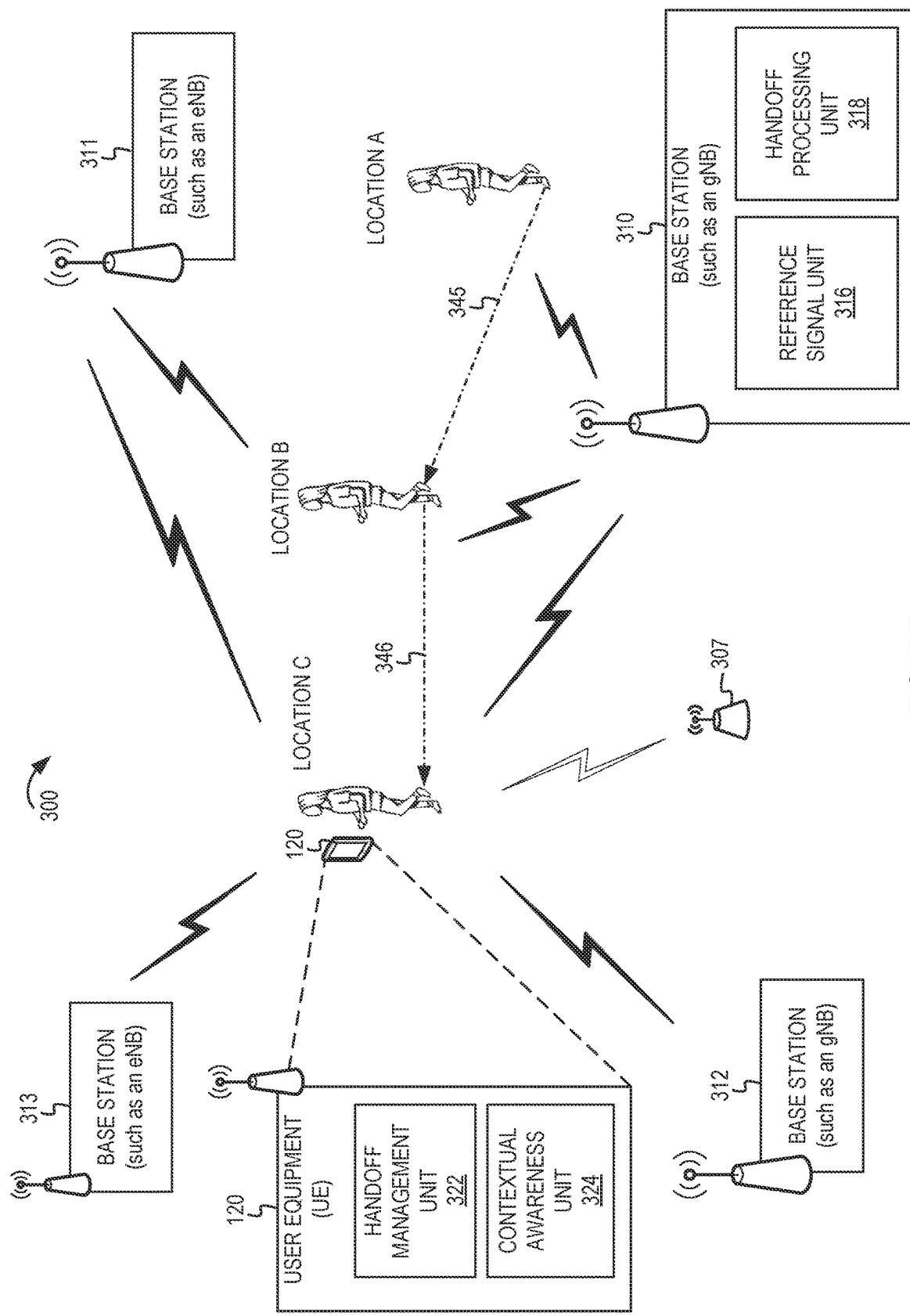
FIG. 3 shows a system diagram of an example wireless communication network including a UE that is configured to limit a quantity of handoffs between cellular networks.

FIG. 3 shows a system diagram of an example wireless communication network including a UE 120 that is configured to limit a quantity of handoffs between cellular networks. The wireless communication network 300 shown in FIG. 3 is based on the example wireless communication network 100 described in FIG. 1. The wireless communication network 300 may include the UE 120, a BS 310 of a 5G NR network, a BS 312 of the 5G NR network, a BS 311 of an LTE network, a BS 313 of the LTE network, and an AP 307 of a WLAN. The UE 120 may be an example implementation of the UE 115 shown in FIG. 1 and the UE 120 shown in FIG. 2. The BS 310, the BS 311, the BS 312, and the BS 313 may each be an example implementation of the BS 105 shown in FIG. 1 and the BS 110 shown in FIG. 2. Although not shown for simplicity, the wireless communication network 300 may include one or more additional BSs, one or more additional APs, and one or more additional UEs. In some implementations, the BS 310 and the BS 312 may be gNBs that may implement a 5G NR radio access technology (RAT) described in this disclosure to manage communications of a 5G NR network. In some implementations, the BS 311 and the BS 313 may be eNBs that may implement an LTE RAT described in this disclosure to manage communications of an LTE network. In some implementations, the BS 310 and the BS 312 may implement a first RAT that supports any one of 5G NR, LTE, and 3G communications, and the BS 311 and the BS 313 may implement a second RAT that supports any one of 5G NR, LTE, and 3G communications. In some implementations, the AP 307 may implement a third RAT that supports WLAN communications. In some implementations, the BS 310 and the BS 312 may implement a 5G NR RAT having a standalone (SA) 5G architecture or an LTE RAT having an SA 4G architecture, and the BS 311 and the BS 313 may implement a 5G NR RAT or an LTE RAT having a non-standalone (NSA) 5G architecture.

In some implementations, the UE 120 may include a handoff management unit 322 and a contextual awareness unit 324. The handoff management unit 322 may manage handoff-related operations, including handover-related operations and reselection-related operations. The handoff management unit 322 also may monitor, count, or otherwise determine the quantity of handoffs that are performed within a time period and determine whether to reduce the rate of handoffs for the UE. Furthermore, the handoff management unit 322 may determine which RAT to camp on when the rate of handoffs is reduced. The UE contextual awareness unit 324 may collect contextual awareness information associated with the user of the UE, such as a user's typical daily and weekly schedule, the typical location of the user at various times, the user's typical driving routes, the applications the user typically uses at various times, among others. The contextual awareness unit 324 may determine historical contextual awareness information based on the collected contextual awareness information, including historical user patters and user behaviors. The contextual awareness unit 324 also may determine real-time contextual awareness information, such as real-time location information, real-time mobility information, and real-time UE usage information. The real-time contextual awareness information and the historical contextual awareness information may be used by the contextual awareness unit 324 and the handoff management unit 322 for determining which RAT to select after reducing the rate of handoffs.

In some implementations, the BS 310 may include a reference signal unit 316 and a handoff processing unit 318. Although not shown for simplicity, the BS 311, the BS 312, and the BS 313 also may include a reference signal unit and a handover processing unit. The reference signal unit 316 may generate and transmit one or more reference signals to UEs of the wireless communication network 300, such as the UE 120. The handoff processing unit 318 may exchange handoff-related messages with the UEs of the wireless communication network 300, such as the UE 120, to determine whether to perform handoff operations, such as handover operations and reselection operations. In some implementations, the handoff management unit 322 and the contextual awareness unit 324 may be implemented by the UE 120 using one or more of the components shown in FIG. 2 for the UE 120, such as the controller/processor 280 and the memory 282. In some implementations, the reference signal unit 316 and the handoff processing unit 318 may be implemented by the BSs shown in FIG. 3 using one or more of the components shown in FIG. 2 for the BS 110, such as the controller/processor 240, the communication unit 244, and the memory 242.

In some implementations, the UE 120 may establish a wireless connection (such as a 5G NR connection) with the BS 310 to perform wireless communications. For example, the UE 120 may establish the wireless connection when the UE 120 is at a first location (such as location A shown in FIG. 1). The UE 120 may exchange wireless communication signals with the BS 310 via the wireless connection to perform a voice call or to present streaming video. The UE 120 may periodically determine the quality of the wireless connection with the BS 310. For example, the UE 120 may perform signal quality measurements based on reference signals received from the BS 310 to determine the signal quality (such as the signal strength) associated with the wireless connection. For example, the signal quality measurements may be reference signal received power (RSRP) measurements, reference signal received quality (RSRQ) measurements, or signal-to-interference-plus-noise ratio (SINR) measurements. The reference signals may include synchronized signal block (SSB) signals, channel state information reference signals (CSI-RSs), or other types of reference signals. The signal quality measurements may be used to determine whether to maintain the wireless connection with the BS 310 associated with the first RAT (such as a 5G NR RAT) or perform a handoff (such as a handover or reselection) to a neighboring BS associated with a second RAT (such as the BS 311 associated with the LTE RAT). In some implementations, the UE 120 also may determine whether a third RAT, such as a WLAN RAT, is available in the wireless communication network 300. If a WLAN RAT is available, the UE 120 may determine the signal quality associated with the WLAN RAT to determine whether to maintain the wireless connection with the first RAT or perform a handoff to the WLAN RAT (such as the AP 307 associated with the WLAN RAT).

In some implementations, the UE 120 also may receive reference signals from one or more neighboring BSs, such as the BS 311. For example, when a user of the UE 120 moves (as shown by arrow 345) from a first location (such as location A) to a second location (such as location B), the user of the UE 120 may be within the coverage range of both the BS 310 and the BS 311, and the UE 120 may receive reference signals from both the BS 310 and the BS 311. The UE 120 may perform signal quality measurements based on the reference signals received from the BS 311 to determine the signal quality associated with the BS 311, in addition performing signal quality measurements based on the reference signals received from the BS 310 to determine the signal quality associated with the BS 310. The signal quality measurements may be used to determine whether to maintain the wireless connection with the BS 310 or perform a handoff (such as a handover or reselection) from the BS 310 to the BS 311. The second location (location B) may be near or at an edge of the coverage area of the BS 310 and the coverage area of the BS 311. For example, since during the initial deployment of the 5G NR networks the 5G NR coverage may not be ubiquitous, the UE 102 may have LTE coverage in most locations, but may have 5G NR coverage in limited areas (such as downtown areas or major highways). Even in areas that have substantial 5G NR deployments, there may be coverage holes between 5G NR coverage areas. In locations that are at the edge of two cellular networks (such as the 5G NR and LTE networks), or in locations that have coverage holes, the UE 120 may move between the two cellular networks multiple times in a short period of time. Frequent handoffs between two cellular networks in a short period of time may lead to throughput degradation and service interruption at the UE. For example, when the user of the UE 120 moves (as shown by arrow 346) from the second location (such as location B) to a third location (such as location C), the user may continue to move in an area that is at the edge of the coverage areas of both the BS 310 and BS 311. Frequent handoffs between two or more cellular networks (such as the 5G NR RAT and the LTE RAT) and a WLAN (such as the WLAN RAT) in a short period of time also may lead to throughput degradation and service interruption at the UE. For example, the UE 120 may experience frequent handoffs between one or more 5G NR RATs, one or more LTE RATs, and one or more WLAN RATs. For example, the UE 120 may experience frequent handoffs between the BS 310 associated with the 5G NR RAT, the BS 311 associated with the LTE RAT, and the AP 307 associated with the WLAN RAT. In some implementations, when the UE 120 experiences handoffs between three or more RATs, the handoffs may be performed in a circular topology, instead of a peer-to-peer topology. For example, handoffs that are performed in a circular topology may include a handoff of the UE 120 from the 5G NR RAT to the LTE RAT, and then a handoff of the UE 120 from the LTE RAT to the WLAN RAT. After the handoff to the WLAN RAT, a handoff of the UE 120 may be performed to the 5G NR RAT or to the LTE RAT. Handoffs that are performed in a peer-to-peer topology may include a handoff of the UE 120 from the 5G NR RAT to the LTE RAT, and then a handoff of the UE 120 from the LTE RAT back to the 5G NR RAT.

As another example, when the user stays stationary near the second location (location B), the user may remain at the edge of the coverage area of both the BS 310 and the BS 311. Whether the user is in motion or is stationary at the edge of the two cellular networks, multiple handoffs may be performed in a short period of time between the BS 310 associated with the first RAT (such as the 5G NR RAT) and the BS 311 associated with a second RAT (such as the LTE RAT). Also, multiple handoffs between the BS 310 and the BS 311 may be performed when the user of the UE 120 moves in and out of a coverage hole. Frequent handoffs between two or more cells of a BS in a short period of time also may lead to throughput degradation and service interruption at the UE. For example, multiple handoffs may be performed between a first cell of the BS 310 and a second cell of the BS 310 when the user moves in and out of the coverage area of the first cell (such as location B) and the coverage area of the second cell (such as location C). As another example, multiple handoffs may be performed between a first cell of the BS 310, a second cell of the BS 310, and a third cell of the BS 310. As another example, multiple handoffs may be performed between a first cell of the BS 310, a second cell of the BS 310, and a first cell of the BS 312.

In some implementations, as the user moves from the second location (such as location B) to a third location (such as location C), multiple handoffs may be performed between the BS 310 and the BS 312 associated with the first RAT (such as the 5G NR RAT) and the BS 311 and the BS 313 associated with the second RAT (such as the LTE RAT). For example, multiple handoffs may be performed between the BS 310 and the BS 311 when the user is closer to the second location (location B), and multiple handoffs may be performed between at least two of the BS 312, the BS 313, and the AP 307 when the user is closer to the third location (location C). For example, multiple handoffs may be performed between the BS 312 and the BS 313 when the user is closer to the third location (location C) and the third location is at an edge of the coverage area of the BS 312 and the BS 313. As another example, multiple handoffs may be performed between a first cell of a BS (such as the BS 310 or the BS 311) and a second cell of the BS when the user moves in and out of the coverage area of the first cell (such as location B) and the coverage area of the second cell (such as location C).

In some implementations, a handoff process may be a reselection process or a handover process. A reselection may be performed when the UE 120 is an idle mode, such as when the user is not actively using the UE 120 and one or more background processes or applications are running on the UE 120. A handover may be performed when the UE 120 is in a connected mode, such as when the user is actively using the UE 120 and one or more foreground applications are being executed by the UE 120. In some implementations, if the UE 120 is in an idle mode when the user is at the edge of the two cellular networks or when the user moves in and out of a coverage hole, the UE 120 may initiate a reselection to move from the BS 310 to the BS 311. For example, based on the signal quality measurements (such as signal strength measurements), the UE 120 may transmit one or more messages to the BS 311 to perform the reselection to move the UE 120 from the BS 310 to the BS 311. For example, the UE 120 may transmit a RACH request to the BS 311 to request access and establish a wireless connection with the BS 311. As soon as the UE 120 moves to the BS 311, another reselection process may be triggered to move the UE 120 from the BS 311 to the BS 310. Multiple reselection processes may be triggered and performed during a short period of time when the user is at the edge of the two cellular networks (such as the 5G NR and LTE networks) or when the user moves in and out of a coverage hole. As another example, multiple reselection processes may be performed between the BS 310 and the BS 311 when the user is closer to the second location (location B), and multiple reselection processes may be performed between the BS 312 and the BS 313 when the user is closer to the third location (location C). As another example, multiple reselection processes may be performed between a first cell of a BS (such as the BS 310 or the BS 311) and a second cell of the BS when the user moves in and out of the coverage area of the first cell (such as location B) and the coverage area of the second cell (such as location C). In some implementations, the UE 120 may determine whether or not to perform one or more of the reselection processes based on contextual awareness information determined by the UE 120, as described further with reference to FIG. 5.

In some implementations, if the UE 120 is in a connected mode when the user is at the edge of the two cellular networks or when the user moves in and out of a coverage hole, the UE 120 may cause the BS 310 to initiate a handover to move the UE 120 from the BS 310 to the BS 311. For example, based on the signal quality measurements (such as signal strength measurements), the UE 120 may transmit one or more messages to the BS 310 to trigger the handover process to move the UE 120 from the BS 310 to the BS 311. For example, the UE 120 may transmit a handover measurement report to the BS 310 to cause the BS 310 to initiate the handover process in order to establish the wireless connection with the BS 311. As soon as the UE 120 moves to the BS 311, another handover process may be triggered to move the UE 120 from the BS 311 to the BS 310. Multiple handover processes may be triggered and performed during a short period of time when the user is at the edge of the two cellular networks (such as the 5G NR and LTE networks) or when the user moves in and out of a coverage hole. As another example, multiple handover processes may be performed between the BS 310 and the BS 311 when the user is closer to the second location (location B), and multiple handover processes may be performed between the BS 312 and the BS 313 when the user is closer to the third location (location C). As another example, multiple handover processes may be performed between a first cell of a BS (such as the BS 310 or the BS 311) and a second cell of the BS when the user moves in and out of the coverage area of the first cell (such as location B) and the coverage area of the second cell (such as location C). In some implementations, the UE 120 may determine whether or not to perform one or more of the handover processes based on contextual awareness information determined by the UE 120, as described further with reference to FIG. 5.

In some implementations, the UE 120 may limit the rate of handoffs when a quantity of handoffs between two or more RATs exceeds a handoff threshold within a time period. For example, the UE 120 may monitor, count, or otherwise determine a quantity of handoffs between the BS 310 and the BS 312 associated with the first RAT (such as the 5G NR RAT) and the BS 311 and the BS 313 associated with the second RAT (such as the LTE RAT). As another example, the UE 120 may monitor, count, or otherwise determine a quantity of handoffs between the BS 310 and the BS 312 associated with the first RAT (such as the 5G NR RAT), the BS 311 and the BS 313 associated with the second RAT (such as the LTE RAT), and the AP 307 associated with a third RAT (such as the WLAN RAT). As another example, the UE 120 may determine a quantity of handoffs between the first RAT having an SA 5G architecture and a second RAT having an NSA 5G architecture, which may be referred to as inter-system handoffs. The quantity of handoffs also may include handoffs between a first cell of a BS (such as the BS 310 or the BS 311) associated with the first RAT (such as the 5G NR RAT or the LTE RAT) and a second cell of the BS. The quantity of handoffs may include a quantity of reselections and handovers. For example, the quality of handoffs may include only reselections, only handovers, or both reselections and handovers. The UE 120 may determine whether the quantity of handoffs exceeds a handoff threshold within the time period. In some implementations, the UE 120 may implement a counter to track the quantity of handoffs within the time period, and may implement a timer for the time period. For example, the counter may be incremented by 1 each time a handoff occurs in either direction between the BS 310 and the BS 311. As another example, the counter may be incremented by 1 each time a handoff occurs, which may include handoffs in either direction between the BS 310 and the BS 311, handoffs in either direction between the BS 310 and the BS 313, handoffs in either direction between the BS 311 and the BS 312, handoffs in either direction between the BS 312 and the BS 313, and handoffs in either direction between cells of a BS (such as the BS 310, the BS 311, the BS 312, or the BS 313). Furthermore, the counter may be incremented by one (1) each time a handoff occurs between any of the cellular networks and the WLAN. The UE 120 may determine whether the quantity of handoffs exceeds a handoff threshold before the time period expires using the counter and the timer, as described further with reference to FIG. 4. The counter and the timer are reset when the time period expires without the quantity of handoffs exceeding the handoff threshold. When the counter and the timer are reset, the timer restarts after the first handoff is detected (such as when the counter is updated to have a value of 1). In some implementations, the handoff threshold and the time period may be preconfigured and may be configurable. For example, the handoff threshold and the time period may be preconfigured and configurable by a user, a wireless communication network provider, or UE manufacturer. The handoff threshold and the time period may be configured with various values. For example, the handoff threshold may be set to 10 handoffs and the time period may be set to 1 minute. As another example, the handoff threshold may be set to 12 handoffs and the time period may be set to 2 minutes. As another example, the handoff threshold may be set to 7 handoffs and the time period may be set to 1 minute.

In some implementations, after determining the quantity of handoffs between the two or more RATs exceeds the handoff threshold, the UE 120 may reduce the rate of handoffs using various techniques. For example, the UE 120 may reduce the rate of handoffs by reducing the frequency of sending handoff-related messages to the BSs, by not sending handoff-related messages to the BSs, by ignoring handoff-related messages received from the BSs, or by altering the information in handoff-related messages that are sent to the BSs. In some implementations, if the UE 120 is in an idle mode, the UE 120 may reduce the rate of reselections by stopping or reducing the frequency of sending RACH requests (or similar messages) to the BSs, such as the BS 310 or the BS 311. The UE 120 also may reduce the rate of reselections by ignoring or reducing the frequency of response to RARs (or similar messages) received from the BS 310 or the BS 311. In some implementations, if the UE 120 is in a connected mode, the UE 120 may reduce the rate of handovers by stopping or reducing the frequency of sending handover measurement reports (or similar messages) to the BSs, such as the BS 310 or the BS 311. The UE 120 also may reduce the rate of handovers by altering the information in the handover measurement reports. Furthermore, the UE 120 may reduce the rate of handovers by ignoring or reducing the frequency of response to handover commands (or similar messages) received from the BSs, such as the BS 310 or the BS 311.

In some implementations, the UE 120 may select either the first RAT (such as the 5G NR RAT) or the second RAT (such as the LTE RAT) to camp on after determining that the quantity of handoffs exceeds the handoff threshold within the time period. For example, selecting either the first RAT or the second RAT to camp on may include the UE 120 selecting either the BS 310 or the BS 311 to establish and maintain a wireless connection with the UE 120 when the rate of handoffs is reduced. As another example, selecting either the first RAT or the second RAT to camp on may include the UE 120 selecting either the BS 312 or the BS 313 to establish and maintain a wireless connection with the UE 120 when the rate of handoffs is reduced. As another example, selecting either the first RAT or the second RAT to camp on may include the UE 120 selecting either the first RAT having an SA 5G architecture or the second RAT having an NSA 5G architecture to establish and maintain a wireless connection with the UE 120 when the rate of handoffs is reduced. In some implementations, the UE 120 may select the RAT that receives the most handoffs from the quantity of handoffs during the time period, or may select the RAT that the UE 120 spends the most time in during the time period. In some implementations, after the UE 120 determines the quantity of handoffs exceeds the handoff threshold within the time period, the UE 120 may determine how many of the handoffs were to the first RAT (associated with the BS 310 and the BS 312) and how many of the handoffs were to the second RAT (associated with the BS 311 and the BS 313). The UE 120 may select the cellular network having the most handoffs from the quantity of handoffs, as described further with reference to FIG. 4. For example, if 6 of the 11 handoffs were to the first RAT, the UE 120 may select the BS 310, or the BS 312 associated with the first RAT to camp on. For example, after determining to reduce the rate of handoffs and after determining that most of the handoffs during the time period were to the BS 310 associated with the first RAT, the UE 120 may select the BS 310 to establish and maintain a wireless connection with the UE 120.

In some implementations, after the UE 120 determines the quantity of handoffs exceeds the handoff threshold within the time period, the UE 120 may determine the amount of time the UE 120 spent connected to the first RAT (which may be referred to as a total connection time) during the time period, and the amount of time the UE 120 spent connected to the second RAT during the time period. For example, the UE 120 may use a timer or a clock to determine and store a timestamp indicating the time instant that each handoff was initiated. The UE 120 may select the cellular network that the UE 120 spent the most time connected to during the time period, as described further with reference to FIG. 4. For example, if the time period is 1 minute, the UE 120 may determine that the UE 120 spent 40 seconds connected to the second RAT and 20 seconds connected to the first RAT based on the timestamps. The UE 120 may select the BS 311, or the BS 313 associated with the second RAT to camp on after determining the UE 120 spent 40 seconds of the 1 minute time period connected to the second RAT. For example, after determining to reduce the rate of handoffs and after determining that the UE 120 spent the most time connected to the BS 311 associated with the second RAT, the UE 120 may select the BS 311 to establish and maintain a wireless connection with the UE 120.

In some implementations, the UE 120 may use contextual awareness information to determine which cellular network to camp on after determining that the quantity of handoffs exceeds the handoff threshold within the time period. For example, selecting either the first RAT or the second RAT to camp on may include the UE 120 selecting either the BS 310 or the BS 311 to establish and maintain a wireless connection with the UE 120 when the rate of handoffs is reduced. As another example, selecting either the first RAT or the second RAT to camp on may include the UE 120 selecting either the BS 312 or the BS 313 to establish and maintain a wireless connection with the UE 120 when the rate of handoffs is reduced. The UE 120 may collect contextual awareness information associated with the UE 120 over a period of time. The UE 120 may select either the first RAT or the second RAT to camp on based on the collected contextual awareness information. The contextual awareness information may include the daily schedule of the user of the UE 120, such as the user's typical location, mobility information, travel patterns, and UE usage during the different times of each day of the week. For example, the user's location may be the global positioning system (GPS) location, the user's mobility information may indicate the user's speed and direction of travel, and the user's UE usage may indicate the active foreground and background applications and other processes of the UE 120. The mobility information also may indicate the type of transport, such as a car, subway, bicycle, train, elevator, etc. In some implementations, the UE 120 may determine historical contextual awareness information based on the contextual awareness information collected over a period of time. For example, the historical contextual awareness information may indicate historical user patterns and user behaviors, such as the typical user location, the typical mobility information, and the typical UE usage at different times during the user's typical daily schedule. The period of time may be preconfigured and may be configurable. For example, the period of time may be preconfigured and configurable by a user, a wireless communication network provider, or UE manufacturer. For example, the configured period of time may be one month, three months, one year, or a period of time starting with the activation of the UE 120, among others. In some implementations, the UE 120 may include a context aware engine, which may be a machine learning (ML) and artificial intelligence (AI) engine of the UE 120 that may be used to analyze the collected contextual awareness information and determine the historical contextual awareness information, including the historical user patterns and user behaviors. For example, the UE 120 may implement the context aware engine in an application processor of the UE 120, in a modem of the UE 120, or distributed across both the application processor and the modem, as described in FIG. 8. The context aware engine of the UE 120 also may be used to predict the location, mobility information, and usage of the UE 120 at certain times during the user's daily schedule based on the historical contextual awareness information. Since the context aware engine is implemented at the UE 120, the context aware engine may perform UE-assisted operations to determine to reduce the rate of handoffs and to select a RAT to camp on. The UE-assisted operations may include collecting and analyzing the contextual awareness information and making dynamic decisions regarding reducing the rate of handoffs and selecting the RAT to camp on based on the real-time and historical contextual awareness information. Unlike network-assisted techniques that are generally slow and may not adapt to dynamic changes, the UE-assisted technique allows the UE 120 to make quick decisions based on each dynamic situation the UE 120 encounters and to adapt to changes in the environment.

In some implementations, the UE 120 also may determine real-time contextual awareness information. For example, the real-time contextual awareness information may include real-time location information, real-time mobility information, and real-time UE usage information. The UE 120 may determine the real-time contextual awareness information using various UE components, such as a GPS module, one or more sensors (such as an accelerometer), and an operating system, among others. In some implementations, the UE 120 may select either the first RAT or the second RAT to camp on based on the historical contextual awareness information and the real-time contextual awareness information. For example, based on the historical contextual awareness information, such as the historical user patterns and user behaviors, the UE 120 may predict that from 8 am to 8:20 am the user will commute to work in a car using a particular route in a highway, the UE 120 will be in a connected mode during the commute, the average speed will be 60 mph, and the UE 120 will traverse an area located at the edge of the coverage areas of a first RAT and a second RAT between 8:11 am and 8:13 am. The historical contextual awareness information also may indicate that between 8:14 am and 8:20 am, the user travels in an area that is within the coverage area of the second RAT. Between 8 am and 8:05 am, the UE 120 may obtain and analyze real-time contextual awareness information to confirm that the user of the UE 120 is traveling in the typical route in the highway during the commute to work. The UE 120 also may predict that multiple handoffs will be performed between 8:11 am and 8:13 am when the UE 120 is at the edge of the coverage areas of the first and second RATs. The UE 120 may determine whether the multiple handoffs exceed the handoff threshold. If the multiple handoffs exceed the handoff threshold, the UE 120 may determine that the historical contextual awareness information indicates that at 8:14 am the user typically travels in an area that is within the coverage area of the second RAT until the user arrives at work.

Thus, after the UE 120 determines that the multiple handoffs exceed the handoff threshold, the UE 120 may use the real-time and historical contextual awareness information to proactively select the second RAT to camp on. For example, if the UE 120 is in an idle mode, the UE 120 may proactively send a RACH request to the BS 311 of the second RAT and exchange other messages to camp on the second RAT. As another example, if the UE 120 is in a connected mode, the UE 120 may proactively alter a handover measurement report to cause a handover of the UE 120 from the first RAT to the second RAT, or to cause the UE 120 to remain connected to the second RAT. Altering the handover measurement report may allow the UE 120 to trigger the handover of the UE 120 to the most favorable RAT quicker and more efficiently. For example, if the UE 120 is connected to the BS 310 of the first RAT, the UE 120 may proactively alter the handover measurement report to indicate the signal quality of the first RAT is weak and the signal quality of the second RAT is strong in order to trigger the handover of the UE 120 from the first RAT to the second RAT. For example, the UE 120 may alter a first RSRP measurement associated with the first RAT to have a first power value that indicates a weak signal quality, and may alter a second RSRP measurement associated with the second RAT to have a second power value that indicates a strong signal quality. As another example, if the UE 120 is connected to the BS 311 of the second RAT, the UE 120 may alter the handover measurement report to indicate the signal quality of the first RAT is weak and the signal quality of the second RAT is strong in order to cause the UE 120 to remain connected to the second RAT. As another example, if the UE 120 is connected to the BS 311 of the second RAT, the UE 120 may alter the handover measurement report to remove any information associated with the first RAT, such as removing any signal quality measurements associated with the BS 310 associated with the first RAT, in order to cause the UE 120 to remain connected to the second RAT. As another example, if the UE 120 is connected to the BS 310 of the first RAT, the UE 120 may alter the handover measurement report to remove any information associated with the first RAT, such as removing any signal quality measurements associated with the BS 310 associated with the first RAT, in order to trigger the handover of the UE 120 from the first RAT to the second RAT.

Figure 4:
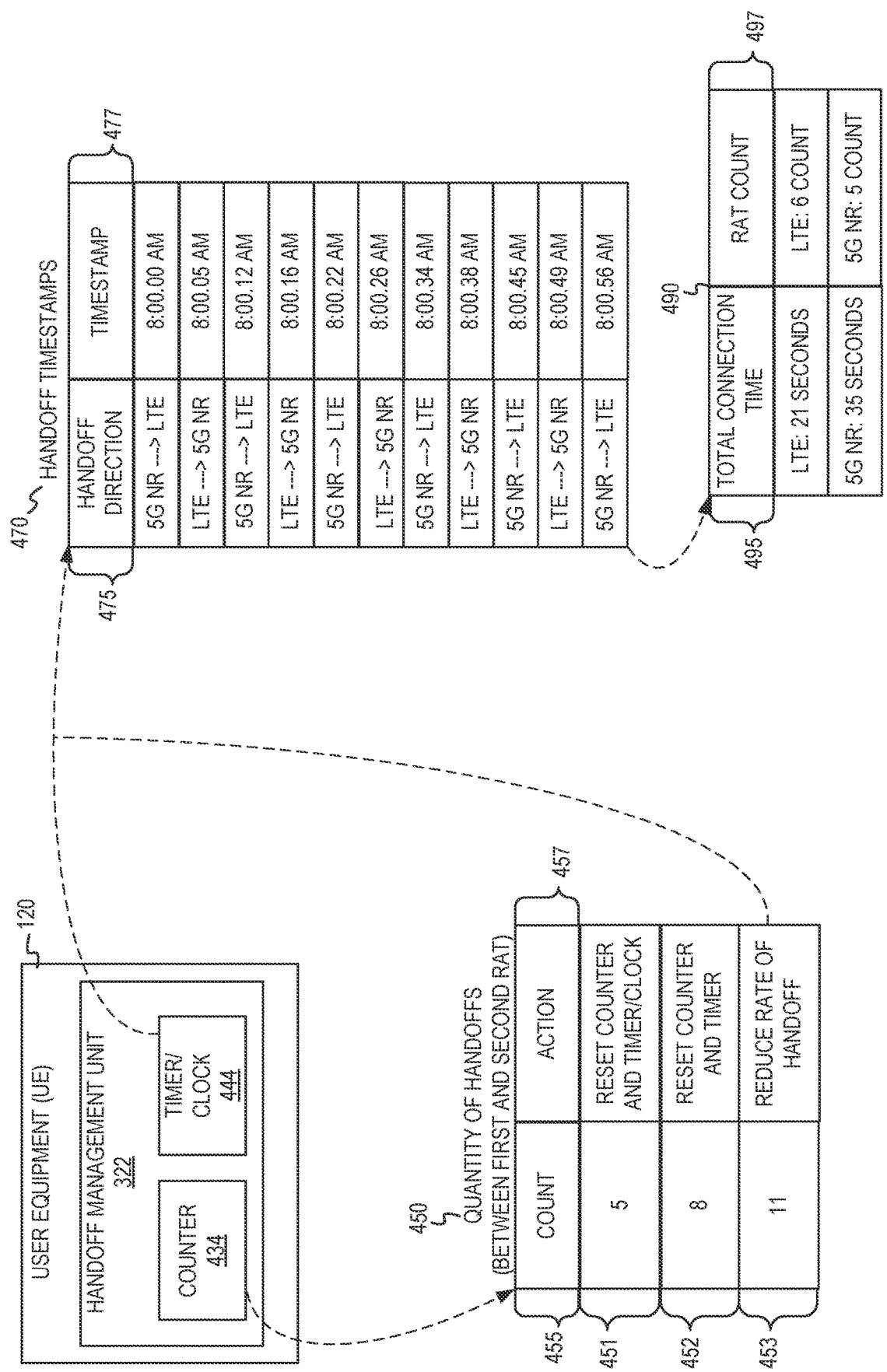

FIG. 4 shows an example UE 120 configured to collect and analyze handoff-related information to determine whether to reduce the rate of handoffs and to select a RAT to camp on. As described in FIG. 3, the UE 120 may include the handoff management unit 322. In some implementations, the handoff management unit 322 may implement a counter 434 and a timer/clock 444.

As described in FIG. 3, the UE 120 may implement the counter 434 to track the quantity of handoffs within a time period, and may implement a timer/clock 444 to monitor the time period. For example, the counter 434 may be incremented by 1 each time a handoff occurs in either direction between a first RAT and a second RAT. In some implementations, the UE 120 may maintain a first table 450 that tracks the quantity of handoffs. For example, the first table 450 may include a count 455 that tracks the quantity of handoffs during the time period, and an action 457 that indicates the action the UE 120 will perform based on the quantity of handoffs. In a first set of handoffs 451 shown in the first table 450, the counter 434 had a count 455 of 5 after the time period expired. If the handoff threshold is 10, the UE 120 may determine that the first set of handoffs 451 did not exceed the handoff threshold. The counter and the timer are reset when the time period expires without the quantity of handoffs exceeding the handoff threshold. Thus, the action 457 after the first set of handoffs 451 is to reset the counter 434 and timer/clock 444. When the counter 434 and the timer/clock 444 are reset, the timer/clock 444 restarts after the first handoff is detected (such as when the count 455 is updated to have a value of 1). In a second set of handoffs 452 shown in the first table 450, the counter 434 had a count 455 of 8 after the time period expired. If the handoff threshold is 10, the UE 120 may determine that the second set of handoffs 452 did not exceed the handoff threshold. Thus, the action 457 after the second set of handoffs 452 is to reset the counter 434 and timer/clock 444. In a third set of handoffs 453 shown in the first table 450, the counter 434 had a count 455 of 11 after the time period expired. If the handoff threshold is 10, the UE 120 may determine that the third set of handoffs 453 exceeded the handoff threshold. Thus, the action 457 after the third set of handoffs 453 is to reduce the rate of handoffs. The UE 120 may reduce the rate of handoffs using one or more of the techniques described in FIG. 3.

In some implementations, the UE 120 may maintain a second table 470 that tracks the handoff timestamps. For example, the second table 470 may include a handoff direction 475 that indicates whether the handoff was from a first RAT to a second RAT (such as from a 5G NR RAT to an LTE RAT) or from the second RAT to the first RAT (such as from the LTE RAT to the 5G NR RAT). As another example, the handoff direction 475 also may indicate whether the handoff was from a first RAT having an SA 5G architecture to a second RAT having an NSA 5G architecture. The second table 470 also may include a timestamp 477 that indicates a time instant that each handoff was initiated. The timestamp 477 may be determined using the timer/clock 444. The second table 470 may show the handoff direction 475 and the timestamp 477 of the third set of handoffs 453 shown in the first table 450. As shown in the second table 470, the first handoff was from a 5G NR RAT to an LTE RAT at 8:00.00 AM, the second handoff was from the LTE RAT to the 5G NR RAT at 8:00.05 AM, the third handoff was from the 5G NR RAT to the LTE RAT at 8:00.12 AM, the fourth handoff was from the LTE RAT to the 5G NR RAT at 8:00.16 AM, the fifth handoff was from the 5G NR RAT to the LTE RAT at 8:00.22 AM, the sixth handoff was from the LTE RAT to the 5G NR RAT at 8:00.26 AM, the seventh handoff was from the 5G NR RAT to the LTE RAT at 8:00.34 AM, the eighth handoff was from the LTE RAT to the 5G NR RAT at 8:00.38 AM, the ninth handoff was from the 5G NR RAT to the LTE RAT at 8:00.45 AM, the tenth handoff was from the LTE RAT to the 5G NR RAT at 8:00.49 AM, and the eleventh handoff was from the 5G NR RAT to the LTE RAT at 8:00.56 AM.

If, for example, the handoff threshold is 10 and the time period is 1 minute, the quantity of handoffs exceeded the handoff threshold when the eleventh handoff was performed at 8:00.56 AM (within the time period). The UE 120 may reduce the rate of handoffs and select a RAT to camp on in response to determining the quantity of handoffs exceeded the handoff threshold within the time period. In some implementations, the UE 120 may select the RAT that the UE 120 spent the most time connected to during the time period, which may be referred to as the total connection time. Based on the timestamp 477 associated with each handoff, the UE 120 may determine that the UE 120 spent 21 seconds connected to the LTE RAT and 35 seconds connected to the 5G NR RAT. Thus, the UE 120 may select the 5G NR RAT since the total connection time associated with the LTE RAT (21 seconds) is less than the total connection time associated with the 5G NR RAT (35 seconds). In some implementations, the UE 120 may store the total connection time 495 in a third table 490. In some implementations, the UE 120 may select the RAT having the most handoffs from the quantity of handoffs. Based on the handoff direction 475 associated with each handoff, the UE 120 may determine that 6 handoffs were from the 5G NR RAT to the LTE RAT, and 5 handoffs were from the LTE RAT to the 5G NR RAT. Thus, the UE 120 may select the LTE RAT since the most handoffs from the quantity of handoffs were from the 5G NR RAT to the LTE RAT. In some implementations, the UE 120 may store the RAT count 497 in the third table 490.

Figure 5:
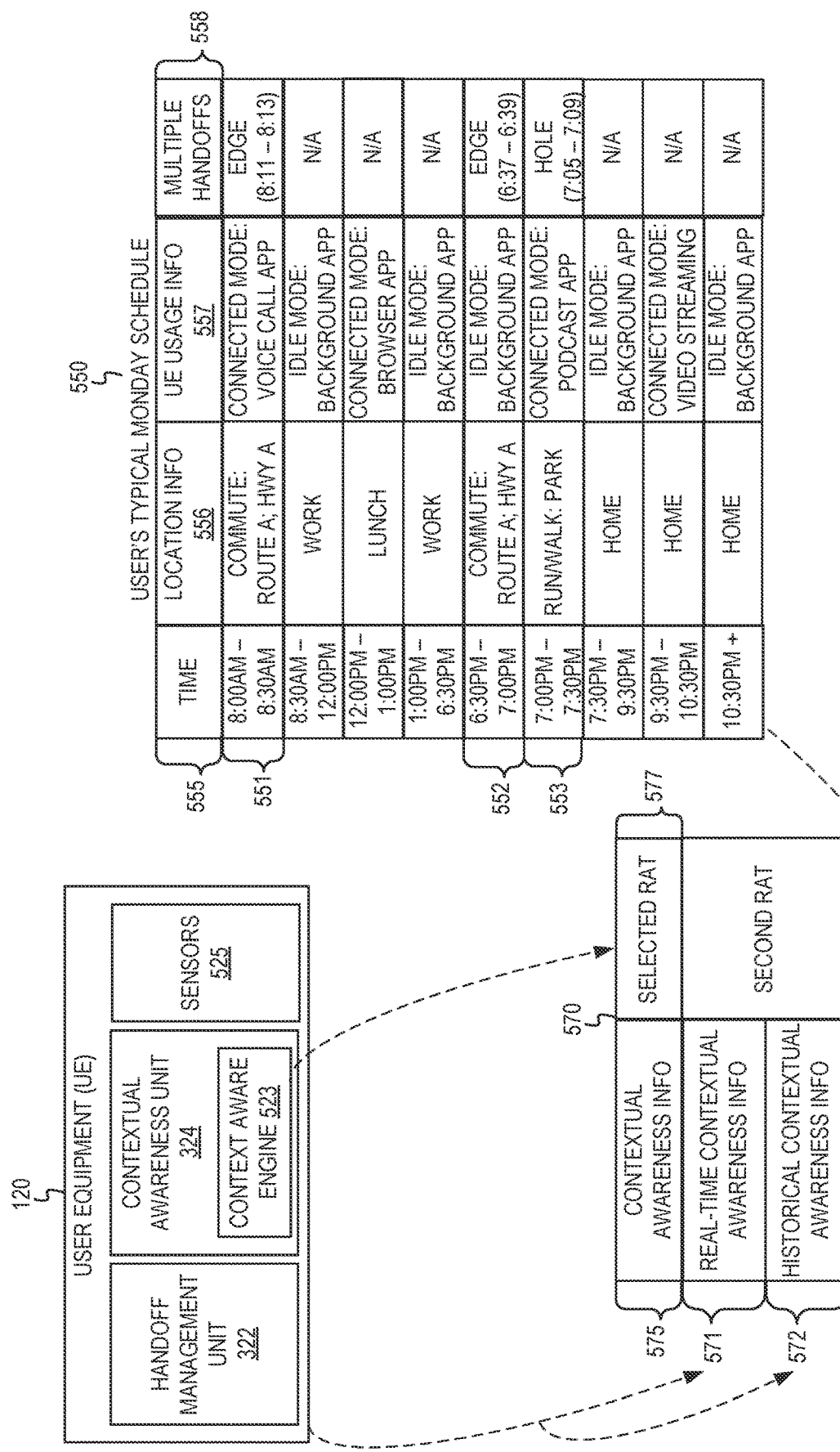
FIG. 5 shows an example UE configured to collect and analyze contextual awareness information to determine which RAT to select to camp on when the rate of handoffs is reduced.

FIG. 5 shows an example UE 120 configured to collect and analyze contextual awareness information to determine which RAT to select to camp on when the rate of handoffs is reduced. As described in FIG. 3, the UE 120 may include the handoff management unit 322 and the contextual awareness unit 324. In some implementations, the contextual awareness unit 324 may include a context aware engine 523. In some implementations, the UE 120 may implement the contextual awareness unit 324 (including the context aware engine 523) in an application processor of the UE 120, in a modem of the UE 120, or distributed across both the application processor and the modem, as described in FIG. 8. In some implementations, the UE 120 also may include sensors 525, such as an accelerometer and a GPS module.

As described in FIG. 3, after determining the quantity of handoffs exceeds the handoff threshold and determining to reduce the rate of handoffs, the UE 120 may use historical and real-time contextual awareness information to select a RAT to camp on. For example, selecting a RAT to camp on may include the UE 120 selecting either the first RAT or the second RAT to establish and maintain a wireless connection with the UE 120 when the rate of handoffs is reduced. In some implementations, the UE 120 may collect contextual awareness information of the daily schedule of the user of the UE 120. For example, the UE 120 may determine and store the user's typical location, mobility information, and UE usage during the different times of each day of the week. For example, the contextual awareness unit 324 of the UE 120 may determine the user's location, the user's speed, and direction of travel using the sensors 525 (such as an accelerometer, a GPS module, and other sensors). The contextual awareness unit 324 of the UE 120 also may determine the mode of operation of the UE 120 (such as an idle mode or connected mode) and the active foreground and background applications. Based on the contextual awareness information that is collected over a period of time, the context aware engine 523 of the contextual awareness unit 324 may determine historical contextual awareness information. For example, the historical contextual awareness information may indicate historical user patterns and user behaviors, such as the typical user location, the typical mobility information, and the typical UE usage at different times during the user's typical daily schedule. The contextual awareness unit 324 and the context aware engine 523 also may use real-time and historical contextual awareness information to predict or infer other contextual awareness information, such as if the user of the UE 120 is inside a car, subway, airplane, driving, running, walking, or sitting. The contextual awareness unit 324 and the context aware engine 523 also may predict or infer network usage patterns when the user is at a certain location at a certain time. For example, the context aware engine 523 may predict if the UE 120 is moving towards or away from a certain coverage area (such as an mmWave small cell coverage area), if the user is moving towards or away from the user's work or home, if the user is moving towards or away a downtown area, and if the user is going to enter or exit an elevator, among others.

The first table 550 shows an example of the user's typical schedule on Mondays, including the corresponding historical contextual awareness information. The historical contextual awareness information shown in the first table 550 may indicate a time 555, location information 556, UE usage information 557, and multiple handoff information 558. The time 555 may indicate a time range during a specific day in the user's typical schedule, in this case a time range during a typical Monday. The location information 556 may indicate the user's location, which also may indicate mobility information. The UE usage information 557 may indicate the mode of operation of the UE 120 (such as an idle mode or connected mode) and the active foreground and background applications. As shown during the time range 551 (between 8 am and 8:30 am), the location information 556 may indicate the user typically commutes to work in a car using a route A in a highway A. The mobility information (not shown) also may indicate that the user is moving at a fast speed. The UE usage information 557 may indicate that the user is typically using a voice call application during the commute and the UE 120 is typically in a connected mode. The multiple handoffs information 558 may indicate that the user typically traverses an edge of two RATs between 8:11 am and 8:13 am, and that this results in multiple handoffs that typically exceed the handoff threshold. In some implementations, between 8 am and 8:05 am, the UE 120 may obtain and analyze real-time contextual awareness information to confirm that the user of the UE 120 is traveling on highway A using the route A to commute to work. Based on the real-time contextual awareness information and the historical contextual awareness information, the UE 120 may predict (such as using the context aware engine 523) that multiple handoffs will be performed between 8:11 am and 8:13 am when the UE 120 is at the edge of the coverage areas of a first RAT (such as a 5G NR RAT) and a second RAT (such as an LTE RAT). Between 8:11 am and 8:13 am, the UE 120 may determine whether the multiple handoffs exceed the handoff threshold. If the multiple handoffs exceed the handoff threshold, the UE 120 may reduce the rate of handoffs and may select one of the RATs to camp on. The UE 120 may determine that the historical contextual awareness information indicates that starting at 8:14 am the user typically travels in an area that is within the coverage area of the second RAT until the user arrives at work. For example, the historical sensor information collected using the sensors 525 may be used to determine the location and mobility information that indicates that at 8:14 am the user typically travels in the area that is within the coverage area of the second RAT until the user arrives at work. Also, the real-time sensor information collected using the sensors 525 may be used to confirm the real-time location of the user, including confirming the route the user is traveling on. Thus, the UE 120 may use the real-time and historical contextual awareness information to proactively select the second RAT to camp on when the rate of handoffs is reduced. In some implementations, the UE 120 also may access additional real-time contextual awareness information to determine the voice call application is active and the UE 120 is in a connected mode. Since the user is performing a voice call, the UE 120 may determine that reducing the rate of handoffs and selecting the second RAT to camp on will reduce service interruptions and improve the user experience.

In some implementations, the second table 570 shows the UE 120 determining the contextual awareness information 575, including the real-time contextual awareness information 571 and the historical contextual awareness information 572, for use in selecting one of the RATs. The selected RAT information 577 may indicate the RAT that is selected by the UE 120. For example, as described herein for time range 551, the UE 120 may use the real-time contextual awareness information 571 and the historical contextual awareness information 572 to determine to select the second RAT to camp on when the rate of handoffs is reduced.

As another example, during the time range 552 (between 6:30 pm and 7:00 pm), the location information 556 may indicate the user typically commutes to back home in a car using the route A in the highway A. The mobility information (not shown) also may indicate that the user is moving at a fast speed. The UE usage information 557 may indicate that the UE 120 is typically in an idle mode with only background applications running on the UE 120. The multiple handoffs information 558 may indicate that the user typically traverses an edge of two RATs between 6:37 pm and 6:39 pm, and that this results in multiple handoffs that typically exceed the handoff threshold. Between 86:37 pm and 6:39 pm, the UE 120 may determine that the multiple handoffs exceed the handoff threshold, and also may confirm that the UE 120 is in an idle mode (with only background applications active). In some implementations, since the UE 120 is in an idle mode, the UE 120 may determine to reduce the rate of handoffs, but may determine to remain connected to the first RAT, even if the service quality is not as good as the second RAT, since service interruptions do not affect background applications. Thus, in some implementations, the UE 120 may determine whether or not to perform a handoff based on the contextual awareness information determined by the UE 120.

As another example, during the time range 553 (between 7:00 pm and 7:30 pm), when the user typically walks or runs in a neighborhood park, the user typically listens to podcasts on a podcast application. The UE 120 may determine that between 7:05 pm and 7:09 pm during the user's run or walk, the user typically traverses an area that has a coverage hole that typically results in multiple handoffs. Between 7:00 pm and 7:05 pm, the UE 120 may confirm that the user is at the location corresponding to the park. The UE 120 also may confirm that between 7:05 pm and 7:09 pm the multiple handoffs exceed the handoff threshold. The UE 120 may reduce the rate of handoffs and may select one of the RATs to camp on. The UE 120 may determine that the historical contextual awareness information indicates that starting at 7:10 pm the user typically passes the coverage hole and begins walking or running in an area that is within the coverage area of the first RAT. Thus, the UE 120 may use the real-time and historical contextual awareness information to proactively select the first RAT to camp on when the rate of handoffs is reduced.

In some implementations, when monitoring the multiple handoffs to determine whether the quantity of handoffs exceeds the handoff threshold, the UE 120 may determine whether or not to perform one or more of the handoffs based on the contextual awareness information determined by the UE 120. The UE 120 may determine real-time and historical contextual awareness information to determine whether or not to perform one or more of the handoffs. For example, during the time range 553 (between 7:00 pm and 7:30 pm), if the UE usage information indicates that the UE 120 is in an idle mode, the UE 120 may determine not to perform one or more of the handoffs. As another example, if the location information and the mobility information indicates that the user is moving at a moderate or fast speed (such as in a bicycle) and the coverage hole at the location (such as the park) affects a relatively small area, the UE 120 may determine not to perform a handoff because the user will likely traverse the coverage hole in a relatively short amount of time with minimal service disruption. As another example, if the location information and the mobility information indicates that the user is moving at a moderate or fast speed (such as in a bicycle) and the coverage hole at the location affects a relatively large area, the UE 120 may determine to perform one or more handoffs because the user will likely take a significant amount of time to traverse the coverage hole, which may lead to a significant service disruption.

Figure 6:
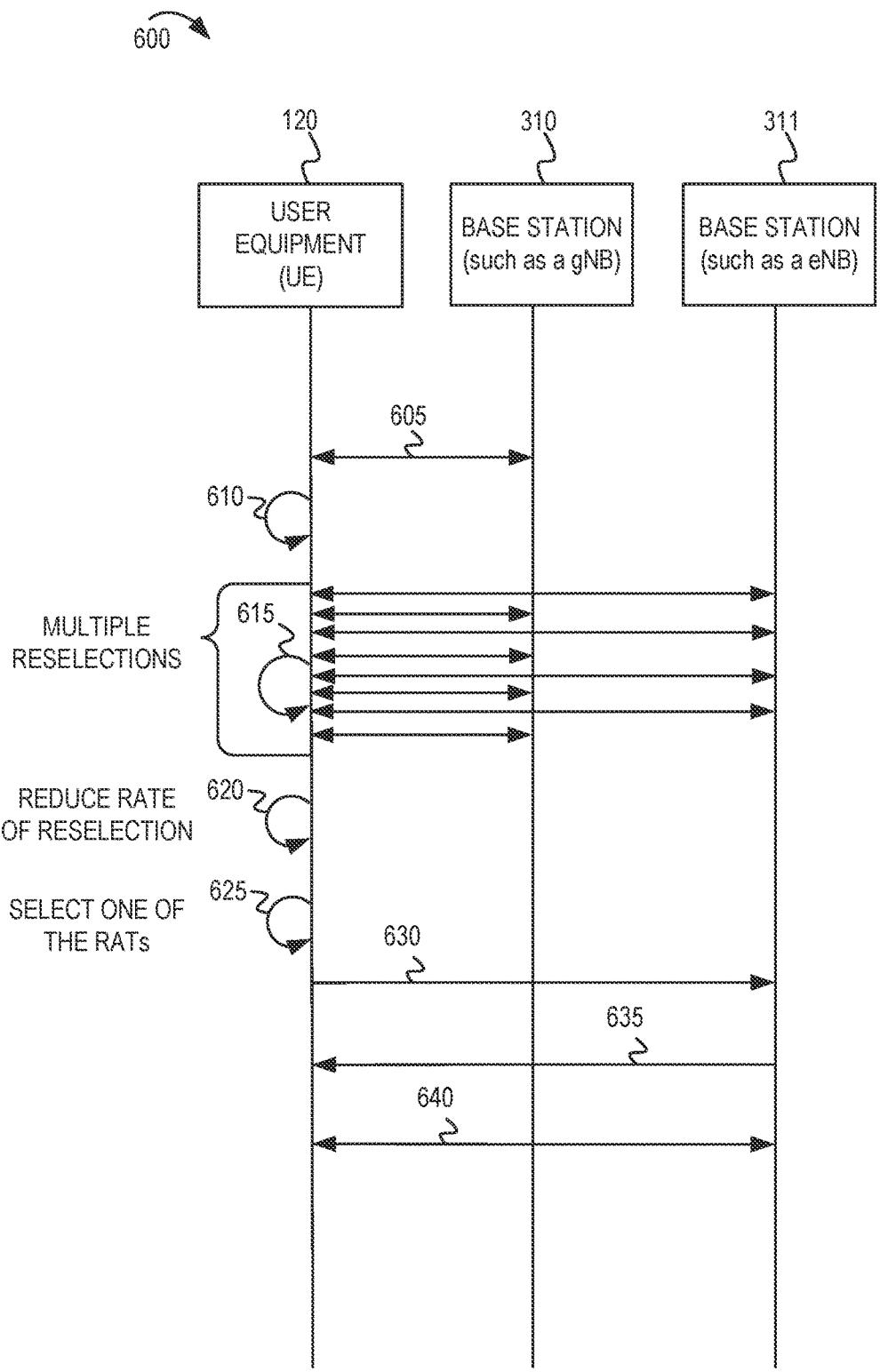
FIG. 6 shows an example message flow that shows a UE configured to reduce the rate of reselection and select either a first BS associated with a first RAT or a second BS associated with a second RAT.

FIG. 6 shows an example message flow that shows a UE configured to reduce the rate of reselection and select either a first BS associated with a first RAT or a second BS associated with a second RAT. The message flow diagram 600 includes the UE 120, the BS 310 associated with a first RAT (such as a 5G NR RAT), and the BS 311 associated with a second RAT (such as an LTE RAT) that are described in FIG. 3. In some implementations, the first RAT may have an SA 5G architecture or an SA 4G architecture, and the second RAT may have an NSA 5G architecture.

At 605, the UE 120 and the BS 310 may establish a wireless connection and exchange various types of messages, including data signals. For example, the UE 120 and the BS 310 may perform operations associated with web browsing, a voice call, or streaming video.

At 610, the UE 120 may change from a connected mode to an idle mode. For example, when the user of the UE 120 stops using the applications (such as the foreground applications) of the UE 120, and only background applications are running, the UE 120 may change to an idle mode.

At 615, the UE 120 may perform multiple reselection processes between the BS 310 associated with the first RAT and the BS 311 associated with the second RAT. Since the UE 120 is in the idle mode, the type of handoff processes that are performed may be reselection processes.

At 620, the UE 120 may determine whether a quantity of reselections that are performed during a time period exceeds a handoff threshold (which also may be referred to as a reselection threshold). For example, as described in FIGS. 3 and 4, the UE 120 may use the counter 434 and the timer/clock 444 to determine whether the quantity of reselections exceeds the handoff threshold (such as a handoff threshold of 10 reselections) during the time period (such as a time period of 1 minute). If the quantity of reselections exceeds the handoff threshold, the UE 120 may reduce the rate of reselections, as described in FIGS. 3 and 4. In some implementations, if the UE 120 is in an idle mode, the UE 120 may reduce the rate of reselections by stopping or reducing the frequency of sending RACH requests (or similar messages) to the BSs, such as the BS 310 or the BS 311. The UE 120 also may reduce the rate of reselections by ignoring or reducing the frequency of response to RARs (or similar messages) received from the BS 310 or the BS 311.

At 625, the UE 120 may select one of the RATs to camp on when the rate of reselections is reduced. For example, the UE 120 may determine to camp on either the BS 310 associated with the first RAT or the BS 311 associated with the second RAT. In some implementations, the UE 120 may select the RAT having the most reselections from the quantity of handoffs, or the UE 120 may select the RAT that the UE 120 spent the most time connected to during the time period, as described in FIGS. 3 and 4. In some implementations, the UE 120 may select the RAT based on real-time contextual awareness information and historical contextual awareness information, as described in FIGS. 3 and 5. As shown in FIG. 6, the UE 120 may select the BS 311 associated with the second RAT to camp on when the rate of reselection is reduced.

At 630, the UE 120 may transmit a RACH request to the BS 311 associated with the second RAT to initiate a session with the BS 311 and request access.

At 635, the BS 311 may respond to the RACH request by sending a RAR to the UE 120 that grants the request for access.

At 640, the UE 120 and the BS 311 may exchange RRC-related messages to establish the wireless connection. For example, the UE 120 may transit an RRC connection request, the BS 311 may respond with an RRC connection setup message, and the UE 120 may respond with an RRC connection setup complete message. Similar operations as shown in 630-640 may be performed with the BS 310 when the UE 120 selects the BS 310 to camp on.

FIG. 7 shows an example message flow that shows a UE configured to reduce the rate of handovers and select either a first BS associated with a first RAT or a second BS associated with a second RAT. The message flow diagram 700 includes the UE 120, the BS 310 associated with a first RAT (such as a 5G NR RAT), and the BS 311 associated with a second RAT (such as an LTE RAT) that are described in FIG. 3. In some implementations, the first RAT may have an SA 5G architecture or an SA 4G architecture, and the second RAT may have an NSA 5G architecture.

At 705, the UE 120 and the BS 310 may establish a wireless connection and exchange various types of messages, including data signals. For example, the UE 120 and the BS 310 may perform operations associated with web browsing, a voice call, or streaming video.

At 710, while the UE 120 is in a connected mode, the UE 120 may cause the BS 310 associated with the first RAT and the BS 311 associated with the second RAT to perform multiple handovers. For example, the UE 120 may trigger the BS 310 and the BS 311 to perform multiple handovers by sending multiple handover measurement reports. Since the UE 120 is in the connected mode, the type of handoff processes that are performed may be handover processes.

At 715, the UE 120 may determine whether a quantity of handovers that are performed during a time period exceeds a handoff threshold (which also may be referred to as a handover threshold). For example, as described in FIGS. 3 and 4, the UE 120 may use the counter 434 and the timer/clock 444 to determine whether the quantity of handovers exceeds the handoff threshold (such as a handoff threshold of 10 handovers) during the time period (such as a time period of 1 minute). If the quantity of handovers exceeds the handoff threshold, the UE 120 may reduce the rate of handovers, as described in FIGS. 3 and 4. In some implementations, if the UE 120 is in a connected mode, the UE 120 may reduce the rate of handovers by stopping or reducing the frequency of sending handover measurement reports (or similar messages) to the BSs, such as the BS 310 or the BS 311. The UE 120 also may reduce the rate of handovers by altering the information in the handover measurement reports. For example, the UE 120 may alter the handover measurement report to indicate that the signal quality of the RAT the UE 120 is camped on (after the rate of handovers is reduced) is strong and the signal quality of the other RAT is weak. As another example, the UE 120 may alter the handover measurement report to remove the signal quality measurement information associated with the RAT the UE 120 is not camped on. Furthermore, the UE 120 may reduce the rate of handovers by ignoring or reducing the frequency of response to handover commands (or similar messages) received from the BSs, such as the BS 310 or the BS 311.

At 720, the UE 120 may select one of the RATs to camp on when the rate of handovers is reduced. For example, the UE 120 may determine to camp on either the BS 310 associated with the first RAT or the BS 311 associated with the second RAT. In some implementations, the UE 120 may select the RAT having the most handovers from the quantity of handovers, or the UE 120 may select the RAT that the UE 120 spent the most time connected to during the time period, as described in FIGS. 3 and 4. In some implementations, the UE 120 may select the RAT based on real-time contextual awareness information and historical contextual awareness information, as described in FIGS. 3 and 5. As shown in FIG. 7, the UE 120 may select the BS 311 associated with the second RAT to camp on when the rate of handovers is reduced.

At 725, after selecting the BS 311 associated with the second RAT, the UE 120 may transmit a handover measurement report to the BS 310 to cause the BS 310 to initiate a handover of the UE 120 from the BS 310 to the BS 311. In some implementations, the UE 120 may alter the handover measurement report to ensure that the handover measurement report triggers a handover of the UE 120 from the BS 310 to the BS 311. For example, the UE 120 may alter the handover measurement report to indicate that the signal quality of the BS 311 associated with the second RAT is strong and the signal quality of the BS 310 associated with the first RAT is weak to trigger the handover. As another example, the UE 120 may alter the handover measurement report to remove the signal quality measurement information associated with the BS 310 associated with the first RAT to trigger the handover.

At 730, the BS 310 may receive the handover measurement report from the UE 120 and may initiate a handover of the UE 120 from the BS 310 to the BS 311. For example, the BS 310 may receive the altered handover measurement report, which may trigger the handover.

At 735, after determining to proceed with the handover, the BS 310 and the BS 311 exchange handover-related messages and allocate resources to perform the handover of the UE 120 from the BS 310 to the BS 311. The BS 310 and the BS 311 also may exchange handover-related messages with the UE 120, such as a network handover command and response.

At 740, the UE 120 and the BS 311 may exchange message to complete the handover and establish a wireless connection.

FIG. 8 shows an example message flow that shows a UE configured to monitor a quantity of handoffs between a first RAT, a second RAT and a third RAT to determine whether to reduce the rate of handoffs. The message flow diagram 800 includes the UE 120, the BS 310 associated with a first RAT (such as a 5G NR RAT), the BS 311 associated with a second RAT (such as an LTE RAT), and the AP 307 associated with a third RAT (such as a WLAN RAT) that are described in the description of FIG. 3.

At 805, the UE 120 and the BS 310 may establish a wireless connection and exchange various types of messages, including data signals. For example, the UE 120 and the BS 310 may perform operations associated with web browsing, a voice call, or streaming video.

At 810, multiple handoffs of the UE 120 may be performed between the BS 310, the BS 311, and the AP 307.

At 815, the UE 120 may determine whether a quantity of handoffs that are performed during a time period exceeds a handoff threshold. For example, as described in FIG. 4, the UE 120 may use the counter 434 and the timer/clock 444 to determine whether the quantity of handoffs exceeds the handoff threshold during the time period.

At 820, if the UE 120 determines that the quantity of handoffs exceeds the handoff threshold, the UE 120 may reduce the rate of handoffs, as described in the description of FIGS. 3-4.

At 825, the UE 120 may select one of the RATs to camp on when the rate of handoffs is reduced. For example, the UE 120 may determine to camp on either the BS 310 associated with the first RAT or the BS 311 associated with the second RAT, as described in description of FIGS. 3-5. As shown in FIG. 8, the UE 120 may select the BS 311 associated with the second RAT to camp on when the rate of handoffs is reduced.

At 830, after selecting the BS 311 associated with the second RAT, the UE 120 may transmit a handoff measurement report to the BS 310 to cause the BS 310 to initiate a handoff of the UE 120 from the BS 310 to the BS 311. In some implementations, the UE 120 may alter the handoff measurement report to ensure that the handoff measurement report triggers a handoff of the UE 120 from the BS 310 to the BS 311.

At 835, the BS 310 may receive the handoff measurement report from the UE 120 and may initiate a handoff of the UE 120 from the BS 310 to the BS 311. For example, the BS 310 may receive the altered handoff measurement report, which may trigger the handoff.

At 840, after determining to proceed with the handoff, the BS 310 and the BS 311 exchange handoff-related messages and allocate resources to perform the handoff of the UE 120 from the BS 310 to the BS 311. The BS 310 and the BS 311 also may exchange handoff-related messages with the UE 120, such as a network handoff command and response.

At 845, the UE 120 and the BS 311 may exchange message to complete the handoff and establish a wireless connection.

FIG. 9 shows an example UE 120 configured to collect and analyze contextual awareness information to determine whether to reduce the rate of handoffs and to select which RAT to camp on. In some implementations, the UE 120 may include an application processor 928 and a modem 929. The UE 120 may include a modem control interface 926 between the application processor 928 and the modem 929. The modem control interface 926 may be a communication interface between the application processor 928 and the modem 929. In some implementations, the application processor 928 may include the contextual awareness unit 324 described in FIGS. 3-8. The contextual awareness unit 324 may include the context aware engine 523, as described in FIG. 5. In some implementations, the UE 120 may include the contextual awareness unit 324 in the modem 929 (not shown) or distributed across both the application processor 928 and the modem 929.

As described in FIGS. 3-8, the contextual awareness unit 324 may collect and analyze contextual awareness information. For example, the contextual awareness unit 324 may determine historical contextual awareness information based on the collected contextual awareness information, and also may determine real-time contextual awareness information. As described in FIGS. 3-8, the UE 120 may use the historical and real-time contextual awareness information to determine whether to reduce the rate of handoffs and to select which RAT to camp on. In some implementations, based on the historical and real-time contextual awareness information determined by the contextual awareness unit 324, the application processor 928 may provide a modem control command 981 to the modem 929 via the modem control interface 926 to cause the modem 929 to reduce the rate of handoffs and to select which RAT to camp on using the processes described in FIGS. 3-8. For example, based on the location of the UE 120 and the historical contextual awareness information associated with the location, the application processor 928 may provide a modem control command 981 to the modem 929 to cause the modem 929 to reduce the rate of handoffs and to select which RAT to camp on (as described in FIGS. 3-8). In some implementations, the contextual awareness unit 324 may collect at least a portion of the contextual awareness information from the modem 929 via the modem control interface 926. For example, the modem 929 may periodically provide a modem feedback message 982 to the application processor 928 via the modem control interface 926 that indicates contextual awareness information. For example, the modem feedback message 982 may indicate the location of the UE 120 and whether the quantity of handoffs exceeded the handoff threshold within the time period. As described in FIGS. 3-8, the contextual awareness unit 324 may use the collected contextual awareness information to determine historical contextual awareness information that may be used to determine when to reduce the rate of handoffs and determine which RAT to camp on. As described in FIGS. 3-8, the historical contextual awareness information also may be used to predict ahead of time when to reduce the rate of handoffs and which RAT to select to camp on in order to reduce or avoid mobility.

FIG. 10 depicts a flowchart 1000 with example operations performed by an apparatus of a UE for reducing a rate of handoffs between wireless networks.

At block 1010, the apparatus of the UE may monitor a quantity of handoffs between a plurality of RATs during a time period. The plurality of WAN RATs may include a first RAT, a second RAT, and a third RAT. In some implementations, the first RAT may be a 5G NR RAT, an LTE RAT, or a 3G RAT, the second RAT may be a 5G NR RAT, an LTE RAT, or a 3G RAT, and the third RAT may be a WLAN RAT. In some implementations, the first RAT may be a 5G NR RAT having a standalone (SA) 5G architecture or an LTE RAT having an SA 4G architecture, and the second RAT may be a 5G NR RAT or an LTE RAT having a non-standalone (NSA) 5G architecture. The apparatus of the UE may monitor, count, or otherwise determine the quantity of handoffs between at least two of a first RAT, a second RAT, and a third RAT during the time period. For example, the apparatus of the UE may determine the quantity of handoffs between a first BS associated with the first RAT, a second BS associated with the second RAT, and an AP associated with the third RAT during the time period. The quantity of handoffs may include reselections, handovers, or both reselections and handovers.

At block 1020, the apparatus of the UE may reduce the rate of handoffs associated with the UE and select one of the plurality of RATs for maintaining a wireless connection with the UE in response to the quantity of handoffs exceeding a handoff threshold within the time period. For example, the apparatus of the UE may reduce the rate of handoffs as described with reference to FIGS. 3 and 4.

In some implementations, in response to determining the quantity of handoffs exceeds the handoff threshold within the time period and determining to reduce the rate of handoffs, the apparatus of the UE may select one of the plurality of WAN RATs. For example, the apparatus of the UE may select either the first BS associated with a first WAN RAT or the second BS associated with the second WAN RAT. For example, the apparatus of the UE may select one of the plurality of WAN RATs as described with reference to FIGS. 3 and 5.

In some implementations, the apparatus of the UE may select one of the plurality of RATs in response to determining the quantity of handoffs exceeds the handoff threshold within the time period. The apparatus of the UE may prioritize one of the plurality of RATs for selection based on a quantity of handoffs associated with each RAT or based on a total connection time associated with each RAT. In some implementations, the apparatus of the UE may determine a first portion of the quantity of handoffs are handoffs to a first RAT of the plurality of RATs, and may determine a second portion of the quantity of handoffs are handoffs to a second RAT of the plurality of RATs. The apparatus of the UE may determine the first portion is greater than the second portion, and may select the first RAT in response to determining the first portion is greater than the second portion. In some implementations, the apparatus of the UE may determine timestamp information at a time instant when each of the quantity of handoffs is initiated, may determine a first portion of the quantity of handoffs are handoffs to a first RAT of the plurality of RATs, and may determine a first total connection time associated with the first portion of the quantity of handoffs to the first RAT based on the timestamp information. The apparatus of the UE may determine a second portion of the quantity of handoffs are handoffs to a second RAT of the plurality of RATs, may determine a second total connection time associated with the second portion of the quantity of handoffs to the second RAT based on the timestamp information, and may determine the first total connection time associated with the first RAT is greater than the second total connection time associated with the second RAT. The apparatus of the UE may select the first RAT in response to determining the first total connection time is greater than the second total connection time.

Figure 11:
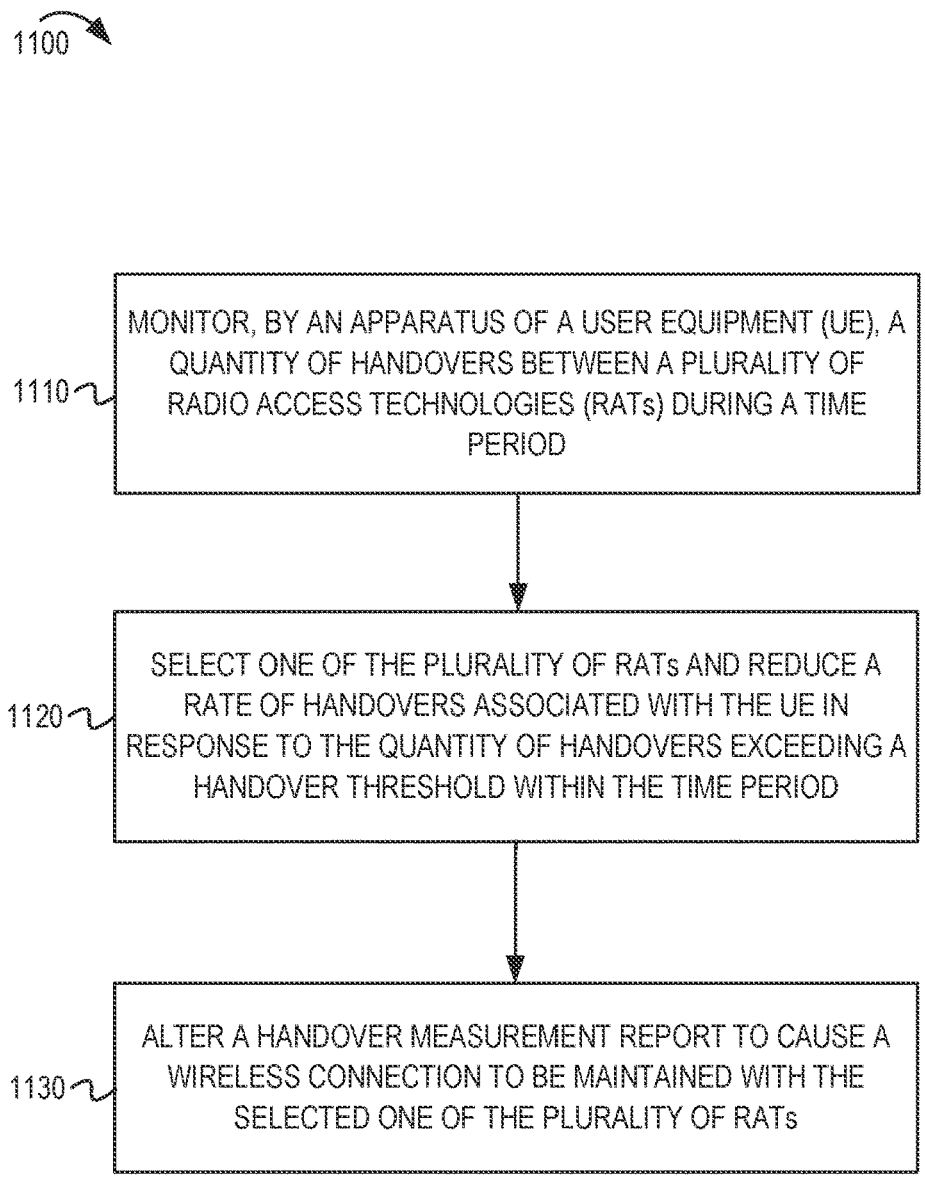

FIG. 11 depicts a flowchart 1100 with example operations performed by an apparatus of a UE for reducing a rate of handovers between wireless networks and selecting one of a plurality of RATs to camp on.

At block 1110, the apparatus of the UE may monitor a quantity of handovers between a plurality of RATs during a time period. The plurality of RATs may include a first RAT, a second RAT, and a third RAT. In some implementations, the first RAT may be a 5G NR RAT, an LTE RAT, or a 3G RAT, the second RAT may be a 5G NR RAT, an LTE RAT, or a 3G RAT, and the third RAT may be a WLAN RAT. In some implementations, the first RAT may be a 5G NR RAT having a standalone (SA) 5G architecture or an LTE RAT having an SA 4G architecture, and the second RAT may be a 5G NR RAT or an LTE RAT having a non-standalone (NSA) 5G architecture. The apparatus of the UE may monitor, count, or otherwise determine the quantity of handovers between at least two of a first RAT, a second RAT, and the third RAT during the time period. For example, the apparatus of the UE may determine the quantity of handovers between a first BS associated with the first RAT, a second BS associated with the second RAT, and an AP of the third RAT during the time period.

At block 1120, the apparatus of the UE may select one of the plurality of RATs and reduce the rate of handovers associated with the UE in response to the quantity of handovers exceeding a handover threshold within the time period. For example, the apparatus of the UE may reduce the rate of handovers as described with reference to FIGS. 3 and 4, and may select one of the plurality of RATs as described with reference to FIGS. 3 and 5.

At block 1130, the apparatus of the UE may alter a handover measurement report to cause a wireless connection to be maintained with the selected one of the plurality of RATs. For example, the apparatus of the UE may alter measurement information of the handover measurement report based on contextual awareness information, and may transmit the altered handover measurement report to cause the wireless connection to be maintained with the selected one of plurality of RATs. In some implementations, the transmission of the altered handover measurement report may cause the wireless connection to be established faster than transmission of a non-altered handover measurement report.

In some implementations, the apparatus of the UE may collect contextual awareness information associated with the UE over a period of time, may determine historical contextual awareness information based on the collected contextual awareness information, and may alter the measurement information of the handover measurement report based on the historical contextual awareness information. In some implementations, the apparatus of the UE may analyze the collected contextual awareness information using ML and AI to determine the historical contextual awareness information. In some implementations, the apparatus of the UE may reduce the rate of handovers by altering measurement information of the handover measurement report based on the historical contextual awareness information. In some implementations, the apparatus of the UE may reduce the rate of handovers by reducing a frequency of transmission of the handover measurement report based on the historical contextual awareness information.

Figure 12:
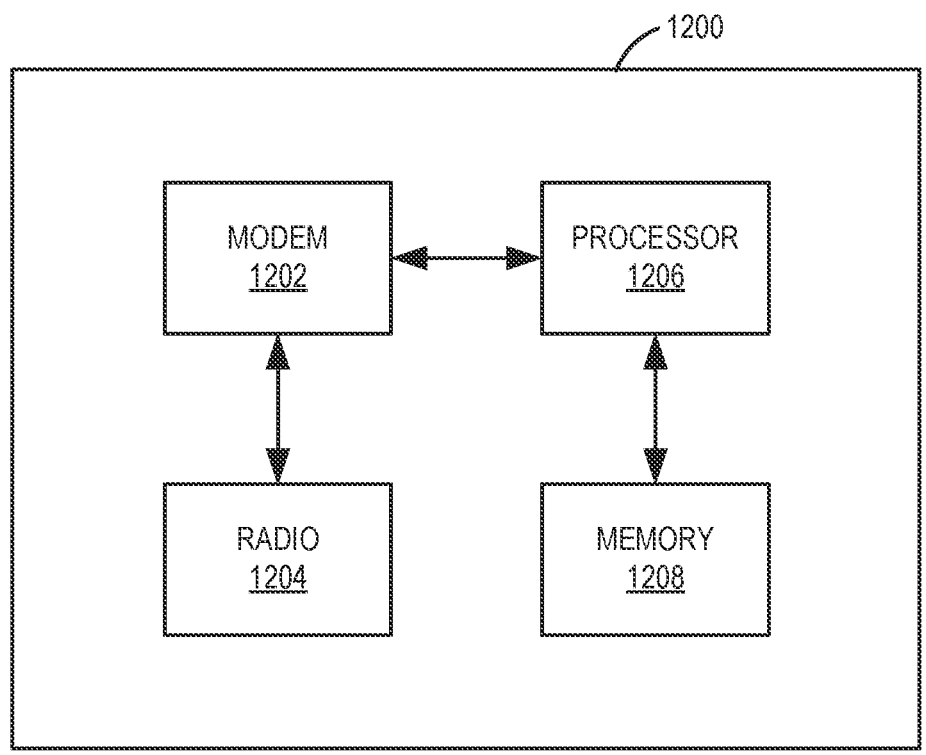
FIG. 12 shows a block diagram of an example wireless communication apparatus.

FIG. 12 shows a block diagram of an example wireless communication apparatus 1200. In some implementations, the wireless communication apparatus 1200 can be an example of a device for use in a UE, such as the UE 120 described above with reference to FIG. 3. In some implementations, the wireless communication apparatus 1200 can be an example of a device for use in a BS, such as the BS 310 or the BS 311 described above with reference to FIG. 3. The wireless communication apparatus 1200 is capable of transmitting (or outputting for transmission) and receiving wireless communications.

The wireless communication apparatus 1200 can be, or can include, a chip, system on chip (SoC), chipset, package or device. The term "system-on-chip" (SoC) is used herein to refer to a set of interconnected electronic circuits typically, but not exclusively, including one or more processors, a memory, and a communication interface. The SoC may include a variety of different types of processors and processor cores, such as a general purpose processor, a central processing unit (CPU), a digital signal processor (DSP), a graphics processing unit (GPU), an accelerated processing unit (APU), a sub-system processor, an auxiliary processor, a single-core processor, and a multicore processor. The SoC may further include other hardware and hardware combinations, such as a field programmable gate array (FPGA), a configuration and status register (CSR), an application-specific integrated circuit (ASIC), other programmable logic device, discrete gate logic, transistor logic, registers, performance monitoring hardware, watchdog hardware, counters, and time references. SoCs may be integrated circuits (ICs) configured such that the components of the IC reside on the same substrate, such as a single piece of semiconductor material (such as, for example, silicon).

The term "system in a package" (SIP) is used herein to refer to a single module or package that may contain multiple resources, computational units, cores and/or processors on two or more IC chips, substrates, or SoCs. For example, a SIP may include a single substrate on which multiple IC chips or semiconductor dies are stacked in a vertical configuration. Similarly, the SIP may include one or more multi-chip modules (MCMs) on which multiple ICs or semiconductor dies are packaged into a unifying substrate. A SIP also may include multiple independent SoCs coupled together via high speed communication circuitry and packaged in close proximity, such as on a single motherboard or in a single mobile communication device. The proximity of the SoCs facilitates high speed communications and the sharing of memory and resources.

The term "multicore processor" is used herein to refer to a single IC chip or chip package that contains two or more independent processing cores (for example a CPU core, IP core, GPU core, among other examples) configured to read and execute program instructions. An SoC may include multiple multicore processors, and each processor in an SoC may be referred to as a core. The term "multiprocessor" may be used herein to refer to a system or device that includes two or more processing units configured to read and execute program instructions.

The wireless communication apparatus 1200 may include one or more modems 1202. In some implementations, the one or more modems 1202 (collectively "the modem 1202") may include a WWAN modem (for example, a 3GPP 4G LTE or 5G compliant modem). In some implementations, the wireless communication apparatus 1200 also includes one or more radios 1204 (collectively "the radio 1204"). In some implementations, the wireless communication apparatus 1200 further includes one or more processors, processing blocks or processing elements 1206 (collectively "the processor 1206") and one or more memory blocks or elements 1208 (collectively "the memory 1208").

The modem 1202 can include an intelligent hardware block or device such as, for example, an application-specific integrated circuit (ASIC) among other possibilities. The modem 1202 is generally configured to implement a PHY layer. For example, the modem 1202 is configured to modulate packets and to output the modulated packets to the radio 1204 for transmission over the wireless medium. The modem 1202 is similarly configured to obtain modulated packets received by the radio 1204 and to demodulate the packets to provide demodulated packets. In addition to a modulator and a demodulator, the modem 1202 may further include digital signal processing (DSP) circuitry, automatic gain control (AGC), a coder, a decoder, a multiplexer and a demultiplexer. For example, while in a transmission mode, data obtained from the processor 1206 is provided to a coder, which encodes the data to provide encoded bits. The encoded bits are then mapped to points in a modulation constellation (using a selected MCS) to provide modulated symbols. The modulated symbols may then be mapped to a number NSS of spatial streams or a number NSTS of space-time streams. The modulated symbols in the respective spatial or space-time streams may then be multiplexed, transformed via an inverse fast Fourier transform (IFFT) block, and subsequently provided to the DSP circuitry for Tx windowing and filtering. The digital signals may then be provided to a digital-to-analog converter (DAC). The resultant analog signals may then be provided to a frequency upconverter, and ultimately, the radio 1204. In implementations involving beamforming, the modulated symbols in the respective spatial streams are precoded via a steering matrix prior to their provision to the IFFT block.

While in a reception mode, digital signals received from the radio 1204 are provided to the DSP circuitry, which is configured to acquire a received signal, for example, by detecting the presence of the signal and estimating the initial timing and frequency offsets. The DSP circuitry is further configured to digitally condition the digital signals, for example, using channel (narrowband) filtering, analog impairment conditioning (such as correcting for I/Q imbalance), and applying digital gain to ultimately obtain a narrowband signal. The output of the DSP circuitry may then be fed to the AGC, which is configured to use information extracted from the digital signals, for example, in one or more received training fields, to determine an appropriate gain. The output of the DSP circuitry also is coupled with the demodulator, which is configured to extract modulated symbols from the signal and, for example, compute the logarithm likelihood ratios (LLRs) for each bit position of each subcarrier in each spatial stream. The demodulator is coupled with the decoder, which may be configured to process the LLRs to provide decoded bits. The decoded bits from all of the spatial streams are then fed to the demultiplexer for demultiplexing. The demultiplexed bits may then be descrambled and provided to the MAC layer (the processor 1206) for processing, evaluation, or interpretation.

The radio 1204 generally includes at least one radio frequency (RF) transmitter (or "transmitter chain") and at least one RF receiver (or "receiver chain"), which may be combined into one or more transceivers. For example, the RF transmitters and receivers may include various DSP circuitry including at least one power amplifier (PA) and at least one low-noise amplifier (LNA), respectively. The RF transmitters and receivers may, in turn, be coupled to one or more antennas. For example, in some implementations, the wireless communication apparatus 1200 can include, or be coupled with, multiple transmit antennas (each with a corresponding transmit chain) and multiple receive antennas (each with a corresponding receive chain). The symbols output from the modem 1202 are provided to the radio 1204, which then transmits the symbols via the coupled antennas. Similarly, symbols received via the antennas are obtained by the radio 1204, which then provides the symbols to the modem 1202.

The processor 1206 can include an intelligent hardware block or device such as, for example, a processing core, a processing block, a central processing unit (CPU), a microprocessor, a microcontroller, a digital signal processor (DSP), an application-specific integrated circuit (ASIC), a programmable logic device (PLD) such as a field programmable gate array (FPGA), discrete gate or transistor logic, discrete hardware components, or any combination thereof designed to perform the functions described herein. The processor 1206 processes information received through the radio 1204 and the modem 1202, and processes information to be output through the modem 1202 and the radio 1204 for transmission through the wireless medium. In some implementations, the processor 1206 may generally control the modem 1202 to cause the modem to perform various operations described above.

The memory 1208 can include tangible storage media such as random-access memory (RAM) or read-only memory (ROM), or combinations thereof. The memory 1208 also can store non-transitory processor- or computer-executable software (SW) code containing instructions that, when executed by the processor 1206, cause the processor to perform various operations described herein for wireless communication, including the generation, transmission, reception and interpretation of MPDUs, frames or packets. For example, various functions of components disclosed herein, or various blocks or steps of a method, operation, process or algorithm disclosed herein, can be implemented as one or more modules of one or more computer programs.

Figure 13:
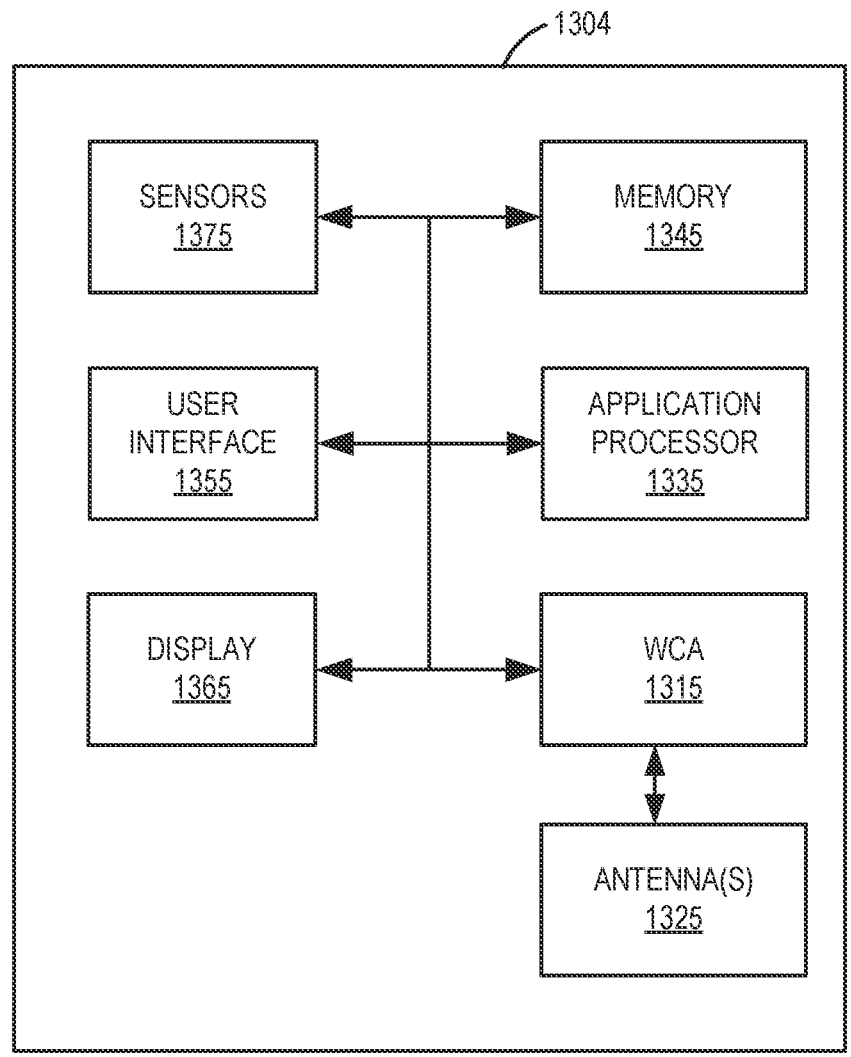
FIG. 13 shows a block diagram of an example mobile communication device.

FIG. 13 shows a block diagram of an example mobile communication device 1304. For example, the mobile communication device 1304 can be an example implementation of the UE 120 described herein. The mobile communication device 1304 includes a wireless communication apparatus (WCA) 1315. For example, the WCA 1315 may be an example implementation of the wireless communication apparatus 1200 described with reference to FIG. 12. The mobile communication device 1304 also includes one or more antennas 1325 coupled with the WCA 1315 to transmit and receive wireless communications. The mobile communication device 1304 additionally includes an application processor 1335 coupled with the WCA 1315, and a memory 1345 coupled with the application processor 1335. In some implementations, the mobile communication device 1304 further includes a UI 1355 (such as a touchscreen or keypad) and a display 1365, which may be integrated with the UI 1355 to form a touchscreen display. In some implementations, the mobile communication device 1304 may further include one or more sensors 1375 such as, for example, one or more inertial sensors, accelerometers, temperature sensors, pressure sensors, or altitude sensors. Ones of the aforementioned components can communicate with other ones of the components directly or indirectly, over at least one bus. The mobile communication device 1304 further includes a housing that encompasses the WCA 1315, the application processor 1335, the memory 1345, and at least portions of the antennas 1325, UI 1355, and display 1365.

FIGS. 1-13 and the operations described herein are examples meant to aid in understanding example implementations and should not be used to limit the potential implementations or limit the scope of the claims. Some implementations may perform additional operations, fewer operations, operations in parallel or in a different order, and some operations differently.

The foregoing disclosure provides illustration and description but is not intended to be exhaustive or to limit the aspects to the precise form disclosed. Modifications and variations may be made in light of the above disclosure or may be acquired from practice of the aspects. While the aspects of the disclosure have been described in terms of various examples, any combination of aspects from any of the examples is also within the scope of the disclosure. The examples in this disclosure are provided for pedagogical purposes. Alternatively, or in addition to the other examples described herein, examples include any combination of the following implementation options.

Clause 1. One innovative aspect of the subject matter described in this disclosure can be implemented in a method for wireless communication performed by an apparatus of a UE. The method may include determining a quantity of handoffs between a plurality of WAN RATs during a time period, determining whether the quantity of handoffs exceeds a handoff threshold within the time period, and reducing a rate of handoffs associated with the UE in response to determining the quantity of handoffs exceeds the handoff threshold within the time period.

Clause 2. The method of clause 1, where the plurality of WAN RATs may include a first WAN RAT and a second WAN RAT. The first WAN RAT may be a 5G NR RAT, an LTE RAT, or a 3G RAT, and the second WAN RAT may be a 5G NR RAT, an LTE RAT, or a 3G RAT.

Clause 3. The method of any one or more of clauses 1-2, where the plurality of WAN RATs may include a first WAN RAT and a second WAN RAT. The first WAN RAT may be a 5G NR RAT having an SA 5G architecture or an LTE RAT having an SA 4G architecture, and the second WAN RAT may be a 5G NR RAT or an LTE RAT having an NSA 5G architecture.

Clause 4. The method of any one or more of clauses 1-3, where the quantity of handoffs may include one or more handovers between the plurality of WAN RATs, one or more reselections between the plurality of WAN RATs, or one or more handovers and reselections between the plurality of WAN RATs.

Clause 5. The method of any one or more of clauses 1-4, further including restarting the time period, and resetting the quantity of handoffs, in response to determining the quantity of handoffs did not exceed the handoff threshold within the time period.

Clause 6. The method of any one or more of clauses 1-5, where determining the quantity of handoffs between the plurality of WAN RATs during the time period may include determining a quantity of handovers and reselections between the plurality of WAN RATs during the time period. The method of reducing the rate of handoffs associated with the UE may include reducing a rate of handovers and reselections associated with the UE.

Clause 7. The method of any one or more of clauses 1-6, where reducing the rate of handoffs associated with the UE may include reducing a rate of handovers associated with the UE. The method may include reducing a frequency of transmission of a handover measurement report to reduce the rate of handovers.

Clause 8. The method of any one or more of clauses 1-7, where reducing the rate of handoffs associated with the UE may include reducing a rate of handovers and reselections associated with the UE. The method may include ignoring a subset of handover and reselection related messages received by the UE from the plurality of WAN RATs to reduce the rate of handovers and reselections.

Clause 9. The method of any one or more of clauses 1-8, further including selecting one of the plurality of WAN RATs in response to determining the quantity of handoffs exceeds the handoff threshold within the time period.

Clause 10. The method of any one or more of clauses 1-9, further including selecting one of the plurality of WAN RATs for establishing and maintaining a wireless connection with the UE when the rate of handoffs is reduced.

Clause 11. The method of any one or more of clauses 1-10, further including determining a first portion of the quantity of handoffs are handoffs to a first WAN RAT of the plurality of WAN RATs, determining a second portion of the quantity of handoffs are handoffs to a second WAN RAT of the plurality of WAN RATs, determining the first portion is greater than the second portion, and selecting the first WAN RAT in response to determining the first portion is greater than the second portion.

Clause 12. The method of any one or more of clauses 1-11, further including determining timestamp information at a time instant when each of the quantity of handoffs is initiated, determining a first portion of the quantity of handoffs are handoffs to a first WAN RAT of the plurality of WAN RATs, determining a first total connection time associated with the first portion of the quantity of handoffs to the first WAN RAT based on the timestamp information, determining a second portion of the quantity of handoffs are handoffs to a second WAN RAT of the plurality of WAN RATs, determining a second total connection time associated with the second portion of the quantity of handoffs to the second WAN RAT based on the timestamp information, determining the first total connection time associated with the first WAN RAT is greater than the second total connection time associated with the second WAN RAT, and selecting the first WAN RAT in response to determining the first total connection time is greater than the second total connection time.

Clause 13. The method of any one or more of clauses 1-12, further including collecting contextual awareness information associated with the UE over a period of time, and selecting one of the plurality of WAN RATs based, at least in part, on the collected contextual awareness information.

Clause 14. The method of any one or more of clauses 1-13, further including determining historical contextual awareness information based on the collected contextual awareness information, determining real-time contextual awareness information associated with the UE, and selecting one of the plurality of WAN RATs based on the historical contextual awareness information and the real-time contextual awareness information.

Clause 15. The method of any one or more of clauses 1-14, where the historical contextual awareness information may include historical user patterns and user behavior.

Clause 16. The method of any one or more of clauses 1-15, where reducing the rate of handoffs may include reducing a rate of handovers. The method may include reducing a frequency of transmission of a handover measurement report to reduce the rate of handovers based on the historical contextual awareness information, or altering the handover measurement report to reduce the rate of handovers based on the historical contextual awareness information.

Clause 17. The method of any one or more of clauses 1-16, further including altering a handover measurement report based on the historical contextual awareness information to aid in establishing a wireless connection with the selected one of the plurality of WAN RATs, and transmitting the altered handover measurement report to cause the wireless connection to be established with the selected one of plurality of WAN RATs.

Clause 18. The method of any one or more of clauses 1-17, where transmitting the altered handover measurement report may cause the wireless connection to be established faster than transmitting a non-altered handover measurement report.

Clause 19. The method of any one or more of clauses 1-18, further including collecting contextual awareness information associated with the UE over a period of time. The method of reducing the rate of handoffs associated with the UE may be based, at least in part, on the contextual awareness information.

Clause 20. The method of any one or more of clauses 1-19, further including determining historical contextual awareness information based on the collected contextual awareness information, and determining real-time contextual awareness information associated with the UE. The method of reducing the rate of handoffs associated with the UE may be based, at least in part, on the historical contextual awareness information, the real-time contextual awareness information, or both.

Clause 21. The method of any one or more of clauses 1-20, where determining the historical contextual awareness information and the real-time contextual awareness information may be performed by an application processor of the UE. The method of reducing the rate of handoffs associated with the UE may be performed by a modem of the UE in response to receiving a command from the application processor. The command provided by the application processor to the modem may be based on the historical contextual awareness information, the real-time contextual awareness information, or both.

Clause 22. The method of any one or more of clauses 1-21, where the quantity of handoffs may include at least one of one or more handoffs between a first BS associated with a first WAN RAT of the plurality of WAN RATs and a second BS associated with a second WAN RAT of the plurality of WAN RATs, one or more handoffs between cells of the first BS associated with the first WAN RAT, and one or more handoffs between cells of the second BS associated with the second WAN RAT.

Clause 23. Another innovative aspect of the subject matter described in this disclosure can be implemented in a method for wireless communication performed by an apparatus of a UE. The method may include determining a quantity of handovers between a plurality of WAN RATs during a time period, determining whether the quantity of handovers exceeds a handover threshold within the time period, selecting one of the plurality of WAN RATs and reducing a rate of handovers associated with the UE in response to determining the quantity of handovers exceeds the handover threshold within the time period, and altering a handover measurement report to cause a wireless connection to be established with the selected one of plurality of WAN RATs.

Clause 24. The method of clause 23, further including altering measurement information of the handover measurement report, and transmitting the altered handover measurement report to cause the wireless connection to be established with the selected one of plurality of WAN RATs.

Clause 25. The method of any one or more of clauses 23-24, further including collecting contextual awareness information associated with the UE over a period of time, determining historical contextual awareness information based on the collected contextual awareness information, and altering the measurement information of the handover measurement report based on the historical contextual awareness information.

Clause 26. The method of any one or more of clauses 23-25, further including analyzing the collected contextual awareness information using ML and AI to determine the historical contextual awareness information.

Clause 27. The method of any one or more of clauses 23-26, where transmitting the altered handover measurement report may cause the wireless connection to be established faster than transmitting a non-altered handover measurement report.

Clause 28. The method of any one or more of clauses 23-27, further including reducing the rate of handovers by altering measurement information of the handover measurement report.

Clause 29. The method of any one or more of clauses 23-28, further including collecting contextual awareness information associated with the UE over a period of time, determining historical contextual awareness information based on the collected contextual awareness information, and reducing the rate of handovers by altering the measurement information of the handover measurement report based on the historical contextual awareness information.

Clause 30. The method of any one or more of clauses 23-29, further including reducing the rate of handovers by reducing a frequency of transmission of the handover measurement report.

Clause 31. The method of any one or more of clauses 23-30, further including collecting contextual awareness information associated with the UE over a period of time, determining historical contextual awareness information based on the collected contextual awareness information, and reducing the rate of handovers by reducing the frequency of transmission of the handover measurement report based on the historical contextual awareness information.

Another innovative aspect of the subject matter described in this disclosure can be implemented in an apparatus that includes one or more processors and one or more interfaces. The one or more processors and the one or more interfaces may be configured to perform any of the above-mentioned methods of clauses 1-31.

Another innovative aspect of the subject matter described in this disclosure can be implemented in a wireless communication device, such as a BS or a UE, which includes the above-mentioned apparatus that is configured to perform any of the above-mentioned methods of clauses 1-31.

Aspects of the subject matter described in this disclosure can be implemented in a device, a software program, a system, or other means to perform any of the above-mentioned methods of clauses 1-31.

Clause 32. Another innovative aspect of the subject matter described in this disclosure can be implemented in a method for wireless communication performed by an apparatus of a UE. The method may include monitoring a quantity of handoffs between a plurality of RATs during a time period. The method may include reducing a rate of handoffs associated with the UE and selecting one of the plurality of RATs for maintaining a wireless connection with the UE in response to the quantity of handoffs exceeding a handoff threshold within the time period.

Clause 33. The method of clause 32, where the plurality of RATs include two or more of a first RAT, a second RAT, and a third RAT. The first RAT may be a 5G NR RAT, an LTE RAT, or a 3G RAT, the second RAT may be a 5G NR RAT, an LTE RAT, or a 3G RAT, and the third RAT may be a WLAN RAT.

Clause 34. The method of any one or more of clauses 32-33, where monitoring the quantity of handoffs between the plurality of RATs during the time period may include monitoring a quantity of handovers and reselections between the plurality of RATs during the time period, and reducing the rate of handoffs associated with the UE includes reducing a rate of handovers and reselections associated with the UE.

Clause 35. The method of any one or more of clauses 32-34, where reducing the rate of handoffs associated with the UE may include reducing a rate of handovers associated with the UE. The method may further include reducing a frequency of transmission of a handover measurement report to reduce the rate of handovers.

Clause 36. The method of any one or more of clauses 32-35, where reducing the rate of handoffs associated with the UE may include reducing a rate of handovers and reselections associated with the UE. The method may further include ignoring a subset of handover and reselection related messages received by the UE from the plurality of RATs to reduce the rate of handovers and reselections.

Clause 37. The method of any one or more of clauses 32-36, where selecting one of the plurality of RATs for maintaining the wireless connection with the UE in response to the quantity of handoffs exceeding the handoff threshold within the time period may further include prioritizing the one of the plurality of RATs and selecting the one of the plurality of RATs for maintaining the wireless connection with the UE when the rate of handoffs is reduced.

Clause 38. The method of any one or more of clauses 32-37, where selecting one of the plurality of RATs may further include determining a first portion of the quantity of handoffs are handoffs to a first RAT of the plurality of RATs, determining a second portion of the quantity of handoffs are handoffs to a second RAT of the plurality of RATs, determining the first portion is greater than the second portion, and selecting the first RAT in response to determining the first portion is greater than the second portion.

Clause 39. The method of any one or more of clauses 32-38, where selecting one of the plurality of RATs may further include determining timestamp information at a time instant when each of the quantity of handoffs is initiated, determining a first portion of the quantity of handoffs are handoffs to a first RAT of the plurality of RATs, determining a first total connection time associated with the first portion of the quantity of handoffs to the first RAT based on the timestamp information, determining a second portion of the quantity of handoffs are handoffs to a second RAT of the plurality of RATs, determining a second total connection time associated with the second portion of the quantity of handoffs to the second RAT based on the timestamp information, determining the first total connection time associated with the first RAT is greater than the second total connection time associated with the second RAT, and selecting the first RAT in response to determining the first total connection time is greater than the second total connection time.

Clause 40. The method of any one or more of clauses 32-39, where selecting one of the plurality of RATs may further include collecting contextual awareness information associated with the UE over a period of time, and selecting the one of the plurality of RATs based, at least in part, on the collected contextual awareness information.

Clause 41. The method of any one or more of clauses 32-40, further including determining historical contextual awareness information based on the collected contextual awareness information, determining real-time contextual awareness information associated with the UE, and selecting the one of the plurality of RATs based on the historical contextual awareness information and the real-time contextual awareness information.

Clause 42. The method of any one or more of clauses 32-41, where reducing the rate of handoffs may include reducing a rate of handovers. The method may further include reducing a frequency of transmission of a handover measurement report to reduce the rate of handovers based on the historical contextual awareness information, or altering the handover measurement report to reduce the rate of handovers based on the historical contextual awareness information.

Clause 43. The method of any one or more of clauses 32-42, further including altering a handover measurement report based on the historical contextual awareness information for maintaining the wireless connection with the selected one of the plurality of RATs, and transmitting the altered handover measurement report to cause the wireless connection to be maintained with the selected one of plurality of RATs.

Clause 44. The method of any one or more of clauses 32-43, further including collecting contextual awareness information associated with the UE over a period of time. The method of reducing the rate of handoffs associated with the UE may be based, at least in part, on the contextual awareness information.

Clause 45. The method of any one or more of clauses 32-44, further including determining historical contextual awareness information based on the collected contextual awareness information, and determining real-time contextual awareness information associated with the UE. The method of reducing the rate of handoffs associated with the UE may be based, at least in part, on the historical contextual awareness information, the real-time contextual awareness information, or both.

Clause 46. The method of any one or more of clauses 32-45, where a determination of the historical contextual awareness information and the real-time contextual awareness information may be performed by an application processor of the UE, and a reduction of the rate of handoffs associated with the UE may be performed by a modem of the UE in response to receiving a command from the application processor. The command provided by the application processor to the modem may be based on the historical contextual awareness information, the real-time contextual awareness information, or both.

Clause 47. Another innovative aspect of the subject matter described in this disclosure can be implemented in a method for wireless communication performed by an apparatus of a UE. The method may include monitoring a quantity of handovers between a plurality of RATs during a time period. The method may include selecting one of the plurality of RATs and reducing a rate of handovers associated with the UE in response to the quantity of handovers exceeding a handover threshold within the time period. The method may include altering a handover measurement report to cause a wireless connection to be maintained with the selected one of plurality of RATs.

Clause 48. The method of clause 47, where altering the handover measurement report to cause the wireless connection to be maintained with the selected one of plurality of RATs may further include altering measurement information of the handover measurement report, and transmitting the altered handover measurement report to cause the wireless connection to be maintained with the selected one of plurality of RATs.

Clause 49. The method of any one or more of clauses 47-48, where altering the measurement information of the handover measurement report may further include collecting contextual awareness information associated with the UE over a period of time, determining historical contextual awareness information based on the collected contextual awareness information, and altering the measurement information of the handover measurement report based on the historical contextual awareness information.

Clause 50. The method of any one or more of clauses 47-49, further including reducing the rate of handoffs by altering measurement information of the handover measurement report or by reducing a frequency of transmission of the handover measurement report.

Clause 51. The method of any one or more of clauses 47-50, further including collecting contextual awareness information associated with the UE over a period of time, determining historical contextual awareness information based on the collected contextual awareness information, and reducing the rate of handovers by altering the measurement information of the handover measurement report based on the historical contextual awareness information.

Clause 52. The method of any one or more of clauses 47-51, further including collecting contextual awareness information associated with the UE over a period of time, determining historical contextual awareness information based on the collected contextual awareness information, and reducing the rate of handovers by reducing the frequency of transmission of the handover measurement report based on the historical contextual awareness information.

Clause 53. Another innovative aspect of the subject matter described in this disclosure can be implemented in an apparatus of a UE for wireless communication. The apparatus of the UE may include one or more interfaces for communicating via a wireless communication network. The apparatus of the UE may include one or more processors configured to monitor a quantity of handoffs between a plurality of RATs during a time period, and reduce a rate of handoffs associated with the UE and select one of the plurality of RATs for maintaining a wireless connection with the UE in response to the quantity of handoffs exceeding a handoff threshold within the time period.

Clause 54. The apparatus of any one or more of clauses 32-46 and 53, where the rate of handoffs may include a rate of handovers, and the one or more processors may be configured to reduce a frequency of transmission of a handover measurement report to reduce the rate of handovers.

Clause 55. The apparatus of any one or more of clauses 32-46 and 53-54, where the one or more processors configured to select one of the plurality of RATs for maintaining the wireless connection with the UE in response to the quantity of handoffs exceeding the handoff threshold within the time period may further include the one or more processors configured to prioritize the one of the plurality of RATs and select the one of the plurality of RATs for maintaining the wireless connection with the UE when the rate of handoffs is reduced.

Clause 56. The apparatus of any one or more of clauses 32-46 and 53-55, where the one or more processors may be further configured to collect contextual awareness information associated with the UE over a period of time, determine historical contextual awareness information based on the collected contextual awareness information, determine real-time contextual awareness information associated with the UE, and select the one of the plurality of RATs based on the historical contextual awareness information and the real-time contextual awareness information.

Clause 57. The apparatus of any one or more of clauses 32-46 and 53-56, where the rate of handoffs may include a rate of handovers, and the one or more processors may be further configured to reduce a frequency of transmission of a handover measurement report to reduce the rate of handovers based on the historical contextual awareness information, or alter the handover measurement report to reduce the rate of handovers based on the historical contextual awareness information.

Clause 58. The apparatus of any one or more of clauses 32-46 and 53-57, where the rate of handoffs may include a rate of handovers, and the one or more processors may be further configured to alter a handover measurement report based on the historical contextual awareness information for maintaining the wireless connection with the selected one of the plurality of RATs, and the one or more interfaces may be further configured to transmit the altered handover measurement report to cause the wireless connection to be maintained with the selected one of plurality of RATs.

Clause 59. Another innovative aspect of the subject matter described in this disclosure can be implemented in an apparatus of a UE for wireless communication. The apparatus of the UE may include one or more interfaces for communicating via a wireless communication network. The apparatus of the UE may include one or more processors configured to monitor a quantity of handovers between a plurality of RATs during a time period, select one of the plurality of RATs and reduce a rate of handovers associated with the UE in response to the quantity of handovers exceeding a handover threshold within the time period, and alter a handover measurement report to cause a wireless connection to be maintained with the selected one of plurality of RATs.

Clause 60. The apparatus of any one or more of clauses 47-52 and 59, where the one or more processors may be further configured to collect contextual awareness information associated with the UE over a period of time, determine historical contextual awareness information based on the collected contextual awareness information, and alter measurement information of the handover measurement report based on the historical contextual awareness information.

Clause 61. The apparatus of any one or more of clauses 47-52 and 59-60, where the one or more processors may be further configured to reduce the rate of handovers by altering measurement information of the handover measurement report or by reducing a frequency of transmission of the handover measurement report.

Aspects of the subject matter described in this disclosure can be implemented in a device, a software program, a system, or other means to perform any of the above-mentioned methods of clauses 32-61.

As used herein, the term "component" is intended to be broadly construed as hardware, firmware, or a combination of hardware and software. As used herein, a processor is implemented in hardware, firmware, or a combination of hardware and software. As used herein, the phrase "based on" is intended to be broadly construed to mean "based at least in part on."

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, or the like.

As used herein, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c.

The various illustrative components, logic, logical blocks, modules, circuits, operations and algorithm processes described in connection with the implementations disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

The hardware and data processing apparatus used to implement the various illustrative components, logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, or, any conventional processor, controller, microcontroller, or state machine. A processor also may be implemented as a combination of computing devices, for example, a combination of a DSP and a microprocessor, multiple microprocessors, one or more microprocessors in conjunction with a DSP core, or any other such configuration. In some implementations, particular processes, operations and methods may be performed by circuitry that is specific to a given function.

As described above, in some aspects implementations of the subject matter described in this specification can be implemented as software. For example, various functions of components disclosed herein, or various blocks or steps of a method, operation, process or algorithm disclosed herein can be implemented as one or more modules of one or more computer programs. Such computer programs can include non-transitory processor- or computer-executable instructions encoded on one or more tangible processor- or computer-readable storage media for execution by, or to control the operation of, data processing apparatus including the components of the devices described herein. By way of example, and not limitation, such storage media may include RAM, ROM, EEPROM, CD-ROM or other optical disk storage, magnetic disk storage or other magnetic storage devices, or any other medium that may be used to store program code in the form of instructions or data structures. Combinations of the above should also be included within the scope of storage media.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one or more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A method for wireless communication performed by an apparatus of a user equipment (UE), comprising:
monitoring a quantity of handoffs between different radio access technologies (RATs) of a plurality of RATs during a time period;
prioritizing one of the plurality of RATs; and
reducing a rate of handoffs associated with the UE and selecting the one of the plurality of RATs for maintaining a wireless connection with the UE in response to the quantity of handoffs exceeding a handoff threshold within the time period.

2. The method of claim 1, wherein the plurality of RATs include two or more of a first RAT, a second RAT, and a third RAT, the first RAT being a 5G New Radio (NR) RAT, a Long-Term Evolution (LTE) RAT, or a 3G RAT, the second RAT being a 5G NR RAT, an LTE RAT, or a 3G RAT, and the third RAT being a wireless local area network (WLAN) RAT.

3. The method of claim 1, wherein:
monitoring the quantity of handoffs between the plurality of RATs during the time period includes monitoring a quantity of handovers and reselections between the plurality of RATs during the time period, and
reducing the rate of handoffs associated with the UE includes reducing a rate of handovers and reselections associated with the UE.

4. The method of claim 1, wherein reducing the rate of handoffs associated with the UE includes reducing a rate of handovers associated with the UE, further comprises:
reducing a frequency of transmission of a handover measurement report to reduce the rate of handovers.

5. The method of claim 1, wherein reducing the rate of handoffs associated with the UE includes reducing a rate of handovers and reselections associated with the UE, further comprises:
ignoring a subset of handover and reselection related messages received by the UE from the plurality of RATs to reduce the rate of handovers and reselections.

6. The method of claim 1, wherein selecting one of the plurality of RATs further comprises:
determining a first portion of the quantity of handoffs are handoffs to a first RAT of the plurality of RATs;
determining a second portion of the quantity of handoffs are handoffs to a second RAT of the plurality of RATs;
determining the first portion is greater than the second portion; and
selecting the first RAT in response to determining the first portion is greater than the second portion.

7. The method of claim 1, wherein selecting one of the plurality of RATs further comprises:
determining timestamp information at a time instant when each of the quantity of handoffs is initiated;
determining a first portion of the quantity of handoffs are handoffs to a first RAT of the plurality of RATs;
determining a first total connection time associated with the first portion of the quantity of handoffs to the first RAT based on the timestamp information;
determining a second portion of the quantity of handoffs are handoffs to a second RAT of the plurality of RATs;
determining a second total connection time associated with the second portion of the quantity of handoffs to the second RAT based on the timestamp information;
determining the first total connection time associated with the first RAT is greater than the second total connection time associated with the second RAT; and
selecting the first RAT in response to determining the first total connection time is greater than the second total connection time.

8. The method of claim 1, wherein selecting one of the plurality of RATs further comprises:
collecting contextual awareness information associated with the UE over a period of time; and
selecting the one of the plurality of RATs based, at least in part, on the collected contextual awareness information.

9. The method of claim 8, further comprising:
determining historical contextual awareness information based on the collected contextual awareness information;
determining real-time contextual awareness information associated with the UE; and
selecting the one of the plurality of RATs based on the historical contextual awareness information and the real-time contextual awareness information.

10. The method of claim 9, wherein reducing the rate of handoffs includes reducing a rate of handovers, further comprises:
reducing a frequency of transmission of a handover measurement report to reduce the rate of handovers based on the historical contextual awareness information, or
altering the handover measurement report to reduce the rate of handovers based on the historical contextual awareness information.

11. The method of claim 9, further comprising:
altering a handover measurement report based on the historical contextual awareness information for maintaining the wireless connection with the selected one of the plurality of RATs; and
transmitting the altered handover measurement report to cause the wireless connection to be maintained with the selected one of the plurality of RATs.

12. The method of claim 1, further comprising:
collecting contextual awareness information associated with the UE over a period of time,
wherein reducing the rate of handoffs associated with the UE is based, at least in part, on the contextual awareness information.

13. The method of claim 12, further comprising:
determining historical contextual awareness information based on the collected contextual awareness information; and
determining real-time contextual awareness information associated with the UE,
wherein reducing the rate of handoffs associated with the UE is based, at least in part, on the historical contextual awareness information, the real-time contextual awareness information, or both.

14. The method of claim 13, wherein:
a determination of the historical contextual awareness information and the real-time contextual awareness information is performed by an application processor of the UE, and
a reduction of the rate of handoffs associated with the UE is performed by a modem of the UE in response to receiving a command from the application processor, the command provided by the application processor to the modem based on the historical contextual awareness information, the real-time contextual awareness information, or both.

15. A method for wireless communication performed by an apparatus of a user equipment (UE), comprising:
monitoring a quantity of handovers between different radio access technologies (RATs) of a plurality of RATs during a time period;
prioritizing one of the plurality of RATs;
selecting the one of the plurality of RATs and reducing a rate of handovers associated with the UE in response to the quantity of handovers exceeding a handover threshold within the time period; and
altering a handover measurement report to cause a wireless connection to be maintained with the selected one of the plurality of RATs.

16. The method of claim 15, wherein altering the handover measurement report to cause the wireless connection to be maintained with the selected one of the plurality of RATs further comprises:
altering measurement information of the handover measurement report; and
transmitting the altered handover measurement report to cause the wireless connection to be maintained with the selected one of the plurality of RATs.

17. The method of claim 16, wherein altering the measurement information of the handover measurement report further comprises:
collecting contextual awareness information associated with the UE over a period of time;
determining historical contextual awareness information based on the collected contextual awareness information; and
altering the measurement information of the handover measurement report based on the historical contextual awareness information.

18. The method of claim 15, further comprising:
reducing the rate of handovers by altering measurement information of the handover measurement report or by reducing a frequency of transmission of the handover measurement report.

19. The method of claim 18, further comprising:
collecting contextual awareness information associated with the UE over a period of time;
determining historical contextual awareness information based on the collected contextual awareness information; and
reducing the rate of handovers by altering the measurement information of the handover measurement report based on the historical contextual awareness information.

20. The method of claim 18, further comprising:
collecting contextual awareness information associated with the UE over a period of time;
determining historical contextual awareness information based on the collected contextual awareness information; and
reducing the rate of handovers by reducing the frequency of transmission of the handover measurement report based on the historical contextual awareness information.

21. An apparatus of a user equipment (UE) for wireless communication, comprising:
one or more interfaces for communicating via a wireless communication network; and
one or more processors configured to:
monitor a quantity of handoffs between different radio access technologies (RATs) of a plurality of RATs during a time period;
prioritize one of the plurality of RATs; and
reduce a rate of handoffs associated with the UE and select the one of the plurality of RATs for maintaining a wireless connection with the UE in response to the quantity of handoffs exceeding a handoff threshold within the time period.

22. The apparatus of claim 21, wherein the rate of handoffs includes a rate of handovers, further comprising:
the one or more processors configured to reduce a frequency of transmission of a handover measurement report to reduce the rate of handovers.

23. The apparatus of claim 21, further comprising the one or more processors configured to:
collect contextual awareness information associated with the UE over a period of time;
determine historical contextual awareness information based on the collected contextual awareness information;
determine real-time contextual awareness information associated with the UE; and select the one of the plurality of RATs based on the historical contextual awareness information and the real-time contextual awareness information.

24. The apparatus of claim 23, wherein the rate of handoffs includes a rate of handovers, further comprising the one or more processors configured to:
reduce a frequency of transmission of a handover measurement report to reduce the rate of handovers based on the historical contextual awareness information, or
alter the handover measurement report to reduce the rate of handovers based on the historical contextual awareness information.

25. The apparatus of claim 23, wherein the rate of handoffs includes a rate of handovers, further comprising:
the one or more processors configured to alter a handover measurement report based on the historical contextual awareness information for maintaining the wireless connection with the selected one of the plurality of RATs; and
the one or more interfaces configured to transmit the altered handover measurement report to cause the wireless connection to be maintained with the selected one of the plurality of RATs.

26. An apparatus of a user equipment (UE) for wireless communication, comprising:
one or more interfaces for communicating via a wireless communication network; and
one or more processors configured to:
monitor a quantity of handovers between different radio access technologies (RATs) of a plurality of RATs during a time period;
prioritize one of the plurality of RATs;
select the one of the plurality of RATs and reduce a rate of handovers associated with the UE in response to the quantity of handovers exceeding a handover threshold within the time period; and
alter a handover measurement report to cause a wireless connection to be maintained with the selected one of the plurality of RATs.

27. The apparatus of claim 26, further comprising the one or more processors configured to:
collect contextual awareness information associated with the UE over a period of time;
determine historical contextual awareness information based on the collected contextual awareness information; and
alter measurement information of the handover measurement report based on the historical contextual awareness information.

28. The apparatus of claim 26, further comprising the one or more processors configured to:
reduce the rate of handovers by altering measurement information of the handover measurement report or by reducing a frequency of transmission of the handover measurement report.

* * * * *